United States Patent
Hoofard et al.

(10) Patent No.: US 7,047,584 B2
(45) Date of Patent: May 23, 2006

(54) SUPPORT LEG SYSTEM AND METHOD FOR SUPPORTING A DOCK LEVELER

(75) Inventors: Richard K. Hoofard, Dallas, TX (US); David C. Saliger, Desoto, TX (US)

(73) Assignee: SPX Dock Products, Inc., Sussex, WI (US)

( * ) Notice: Subject to any disclaimer, the term of this patent is extended or adjusted under 35 U.S.C. 154(b) by 0 days.

(21) Appl. No.: 10/648,402

(22) Filed: Aug. 27, 2003

(65) Prior Publication Data

US 2004/0177455 A1 Sep. 16, 2004

Related U.S. Application Data

(63) Continuation-in-part of application No. 10/385,751, filed on Mar. 12, 2003, now Pat. No. 6,931,686.

(51) Int. Cl.
*E01O 12/00* (2006.01)
*E01O 1/00* (2006.01)

(52) U.S. Cl. .................................. 14/71.1; 14/69.5

(58) Field of Classification Search ................ 14/69.5, 14/71.1, 71.3
See application file for complete search history.

(56) References Cited

U.S. PATENT DOCUMENTS

| | | | |
|---|---|---|---|
| 3,728,753 A | 4/1973 | Beckwith et al. | |
| 3,835,497 A | 9/1974 | Smith | |
| 3,858,264 A | 1/1975 | Kuhns et al. | 14/71 |
| 3,877,102 A * | 4/1975 | Artzberger | 14/71.3 |
| 3,902,213 A | 9/1975 | Pfleger et al. | |
| 3,995,342 A | 12/1976 | Wiener | 14/71.3 |
| 4,279,050 A | 7/1981 | Abbott | 14/71.3 |
| 4,328,602 A | 5/1982 | Bennett | 14/71.3 |
| 4,455,703 A | 6/1984 | Fromme et al. | |
| 4,531,248 A | 7/1985 | Swessel et al. | 14/71.3 |
| 4,560,315 A | 12/1985 | Hahn et al. | 414/401 |
| 4,570,277 A | 2/1986 | Hahn et al. | 14/71.3 |
| 4,605,353 A | 8/1986 | Hahn et al. | 414/401 |
| 4,619,008 A | 10/1986 | Kovach et al. | |
| 4,634,334 A | 1/1987 | Hahn et al. | 414/401 |
| 4,692,755 A | 9/1987 | Hahn et al. | 340/687 |
| 4,744,121 A | 5/1988 | Swessel et al. | 14/71.7 |
| 4,819,770 A | 4/1989 | Hahn | 188/284 |
| 4,843,373 A | 6/1989 | Trickle et al. | 340/540 |
| 4,847,935 A | 7/1989 | Alexander | 14/71.3 |
| 4,865,507 A | 9/1989 | Trickle | 414/401 |
| 4,920,598 A * | 5/1990 | Hahn | 14/71.1 |
| 4,974,276 A | 12/1990 | Alexander | |
| 4,995,130 A | 2/1991 | Hahn et al. | 14/71.3 |

(Continued)

OTHER PUBLICATIONS

U.S. Appl. No. 10/324,012, filed Dec. 20, 2002, entitled "Support Leg System and Method for Supporting a Dock Leveler".

(Continued)

*Primary Examiner*—Raymond W. Addie
(74) *Attorney, Agent, or Firm*—Baker & Hostetler LLP

(57) ABSTRACT

In one embodiment, a dock leveler includes a support leg system configured to remain in a support position when the dock leveler descends rapidly and retract when the dock leveler descends slowly. In another embodiment, a dock leveler includes a multi-tiered lip keeper support system for supporting the ramp at more than one position. In another embodiment, a method of supporting a dock leveler ramp includes attaching a first and second lip engaging apparatus under the ramp.

26 Claims, 19 Drawing Sheets

U.S. PATENT DOCUMENTS

| | | | |
|---|---|---|---|
| 5,040,258 A | 8/1991 | Hahn et al. | 14/71.3 |
| 5,111,546 A | 5/1992 | Hahn et al. | 14/71.3 |
| 5,123,135 A | 6/1992 | Cook et al. | |
| 5,212,846 A | 5/1993 | Hahn et al. | 14/69.5 |
| 5,271,183 A | 12/1993 | Hahn et al. | 49/360 |
| 5,311,628 A * | 5/1994 | Springer et al. | 14/71.1 |
| 5,323,503 A | 6/1994 | Springer | 14/71.3 |
| 5,375,965 A | 12/1994 | Springer et al. | 414/786 |
| 5,416,941 A * | 5/1995 | Hageman | 14/71.7 |
| 5,440,772 A * | 8/1995 | Springer et al. | 14/69.5 |
| 5,442,825 A | 8/1995 | Hahn et al. | 14/71.1 |
| 5,453,735 A | 9/1995 | Hahn | 340/687 |
| 5,531,557 A | 7/1996 | Springer | 414/401 |
| 5,546,623 A | 8/1996 | Hahn | 14/69.5 |
| 5,551,113 A | 9/1996 | Marler et al. | |
| 5,553,343 A | 9/1996 | Alexander | |
| 5,553,987 A | 9/1996 | Ellis | 414/401 |
| 5,560,063 A | 10/1996 | Alten et al. | |
| 5,582,498 A | 12/1996 | Springer et al. | 414/401 |
| 5,640,733 A | 6/1997 | Alten et al. | |
| 5,664,930 A | 9/1997 | Ellis | 414/401 |
| 5,702,223 A | 12/1997 | Hahn et al. | 414/401 |
| 5,713,072 A | 1/1998 | Marth et al. | 455/33.1 |
| 5,762,459 A | 6/1998 | Springer et al. | 414/401 |
| 5,813,072 A * | 9/1998 | Alexander | 14/71.1 |
| 5,832,554 A | 11/1998 | Alexander | |
| 5,882,167 A | 3/1999 | Hahn et al. | 414/401 |
| 5,964,572 A | 10/1999 | Hahn et al. | 414/800 |
| 6,010,297 A | 1/2000 | Hahn et al. | 414/401 |
| 6,035,475 A | 3/2000 | Alexander | |
| 6,061,859 A | 5/2000 | Winter | |
| 6,065,172 A | 5/2000 | Swessel | 14/71.7 |
| 6,070,283 A | 6/2000 | Hahn | 14/71.1 |
| 6,074,157 A | 6/2000 | Hahn | 414/401 |
| 6,085,375 A | 7/2000 | Holm | 14/71.7 |
| 6,092,970 A | 7/2000 | Hahn et al. | 414/401 |
| 6,106,212 A | 8/2000 | Hahn | 414/401 |
| 6,116,839 A | 9/2000 | Bender et al. | 414/401 |
| 6,125,491 A * | 10/2000 | Alexander | 14/69.5 |
| 6,190,109 B1 | 2/2001 | Bender | 414/401 |
| 6,216,303 B1 | 4/2001 | Massey | 14/71.3 |
| 6,220,809 B1 | 4/2001 | Hahn | 414/401 |
| 6,238,163 B1 | 5/2001 | Springer et al. | 414/401 |
| 6,276,016 B1 * | 8/2001 | Springer | 14/71.1 |
| 6,311,352 B1 | 11/2001 | Springer | 14/71.5 |
| 6,322,310 B1 | 11/2001 | Bender et al. | 414/401 |
| 6,327,733 B1 | 12/2001 | Alexander et al. | |
| 6,360,394 B1 | 3/2002 | Hahn | 14/71.1 |
| 6,368,043 B1 | 4/2002 | Leum | 414/401 |
| 6,431,819 B1 | 8/2002 | Hahn | 414/809 |
| 6,440,772 B1 | 8/2002 | Smith | |
| 6,442,783 B1 * | 9/2002 | Yoon et al. | 14/71.1 |
| 6,460,212 B1 | 10/2002 | Massey et al. | |
| 6,473,926 B1 | 11/2002 | Lounsbury | |
| 6,502,268 B1 * | 1/2003 | Ashelin et al. | 14/71.1 |
| 6,627,016 B1 | 9/2003 | Abare | 156/64 |
| 2002/0148055 A1 * | 10/2002 | Alexander | 14/71.1 |
| 2002/0157195 A1 * | 10/2002 | Alexander | 14/71.1 |
| 2004/0117926 A1 * | 6/2004 | Massey | 14/71.1 |

OTHER PUBLICATIONS

U.S. Appl. No. 10/385,751, filed Mar. 12, 2003, entitled "Support Leg moving Apparatus and Method".

U.S. Appl. No. 10/401,948, filed Mar. 31, 2003, entitled "Support Leg Moving Apparatus and Method".

* cited by examiner

SUPPORT LEG SYSTEM AND METHOD FOR SUPPORTING A DOCK LEVELER

CLAIM OF PRIORITY

This application is a Continuation-In-Part of the non-provisional U.S. patent application entitled Support Leg System and Method for Supporting a Dock Leveler, having Ser. No. 10/385,751, and filed Mar. 12, 2003, now U.S. Pat. No. 6,931,686 the disclosure of which is hereby incorporated by reference in its entirety.

FIELD OF THE INVENTION

The present invention relates generally to dock levelers. More particularly, the present invention relates to a method and apparatus for providing support for a dock lever configured to reduce the effects of stump-out and free fall.

BACKGROUND OF THE INVENTION

Dock levelers are mounted in loading docks and are used to bridge a gap between a loading dock and the end of a vehicle parked at the loading dock. For example, trucks or tracker trailers may be loaded and unloaded at loading docks with the help of a dock leveler. The dock leveler enables material handling equipment such as a fork lift to move between the dock and the vehicle bed. Because not all vehicle beds are of the same height, many dock levelers are configured to pivot up and down in order to adjust and create a bridge between the loading dock and the vehicle bed. Typical dock levelers include a ramp portion. In addition, dock levelers may include a lip mounted at the end of the ramp. When a vehicle backs up to the dock, often the lip is extended and rests directly on the bed of the vehicle. Some dock levelers use the bed of the vehicle as a support for the lip and the ramp so that vehicles, such as fork lifts, material, and operators may move between the vehicle bed and the dock.

If a vehicle, whose bed is supporting the dock leveler and load (e.g. fork lift, material, dock worker), were to pull away from the dock, the dock leveler may become unsupported and move rapidly down to a low position under the influence of gravity and strike the support structure in the pit of the dock leveler. This condition is known in the industry as free fall. Free fall can have unpleasant consequences when dock workers or material handling vehicles such as fork lifts are on the dock leveler during a time when free fall occurs. In order to mitigate the effects of free fall, many dock levelers are equipped with various devices in order to limit or negate the effects of free fall.

One such device used to limit the effects of free fall is a support structure known as a support leg. A dock leveler may have one or more support legs. Often a dock leveler has a pair of support legs. Many support legs are configured so that they support the dock leveler at dock level, (a position where the ramp is level with the surrounding loading dock). When vehicles back up to a loading dock with the bed of the vehicle located at dock level or above, the dock leveler may be raised, the lip extended, and the dock leveler lowered until the lip rests on the bed of the vehicle. If the vehicle has a bed located above dock level, the support legs may be slightly above a corresponding support structure configured to support the support legs. Thus, if free fall occurs, the support legs will only permit the dock leveler to fall a limited amount before the support legs engage their support structure.

One problem associated with support legs is that if a vehicle with a bed located below dock level backs up to the dock, the support legs must be retracted to allow the ramp to lower until the lip rests on the bed of the vehicle. If the support legs are not retracted, the deck will be supported at dock level and the lip will fall to rest on the bed of the vehicle. Thus the angle of the lip relative to the vehicle bed will be steeper than normal. This condition of the support legs preventing the deck from being lowered is known in the industry as stump-out.

Stump-out can also occur as a vehicle is loaded. For example, the support legs may initially be above their support structure when the vehicle first backs up to a dock leveler. But as the vehicle is loaded and becomes heavier, the vehicle suspension may deflect due to the increasing load. As the vehicle bed becomes lower and lower the support legs may engage the support structure thus causing stump-out.

Stump-out can also occur when the support legs are still slightly above the corresponding support structure. As a fork truck moves in and out of the vehicle, deflection of the vehicle suspension will cause the vehicle and the dock leveler to move up and down several inches and cause the support legs to impact the corresponding support structure.

Stump-out can cause a variety of problems. For example, the steep angle of lip may inhibit material handling equipment such as fork lift, from exiting the vehicle. The steep ramp may also cause the counterweight of a fork lift to impact the lip causing damage to the dock leveler, and potential injury to the fork lift driver. When stump-out is caused by deflection of the vehicle suspension, the repeated pounding of the support legs on the corresponding support structure can cause structural damage to the dock leveler and to the concrete pit that supports the dock leveler.

In order to avoid stump-out many dock levelers include retractable support legs that maintain the ramp in a substantially horizontal position when the ramp is not in use (i.e., when the dock leveler is not engaged with the truck bed). These legs can be retracted for servicing truck beds that are below dock level. Typically a pair of support legs are pivotally attached to the ramp near the lip hinge and extend downwardly to engage a supporting sub frame. These support legs may be spring biased forward toward a supporting position and may be retracted to a non-supporting position by one of several means.

Both manual and automatic mechanisms have been used to retract support legs. Manual support leg retraction mechanisms may require an operator to engage a mechanism, for example, by pulling a chain to retract the support legs as the ramp is being lowered. Automatic support leg retraction mechanisms typically retract the support legs as the lip of the dock leveler is extended. In this way the support leg is retracted when the lip engages a truck. However, retracting the support legs with manual mechanisms may require additional labor when trying to mate the dock lever to the truck, and retracting the support legs with automatic mechanisms may add complexity to the dock leveler.

Accordingly, a dock leveler that is able to deal with the problems of free fall and stump-out while at the same time reducing the amount of labor and complexity of a dock leveler is desired.

An additional problem can be encountered with dock levelers, particularly mechanical dock levelers that use a lip keeper style support system. Such levelers use the lip in cooperation with a lip keeper to support the leveler in a stored position, in which the ramp is in substantially horizontal position. Support legs may be used with such levelers but are typically only used to prevent the leveler from descending more than about three inches past dock level in the event a vehicle pulls away during loading and unloading.

A problem with some current dock levelers, which are supported in the stored position by lip keeper style support systems, is that there may be situations in which the ramp appears to be in a stored, supported position, but is not actually being supported by the lip and lip keeper. For example, in mechanical dock levelers which are commonly known in the art as described in U.S. Pat. No. 4,847,935, the ramp is upwardly biased by counterbalance springs and held from rising by a device called a holdown. Because of this arrangement these dock levelers in practice are neutrally biased. When holdown device is manually released the ramps rise, but while in the working position the ramp is held in position from rising by the holdown device. Because of this neutral bias, if a truck should pull away from a dock while the lip of the dock leveler is still in the trailer when there is no load on the ramp, the ramp would maintain its position and the lip would move to a vertical pendant position. Depending on the height of the ramp before the truck pulled away, the lip may come to rest in a position where it does not engage the lip keeper but the ramp may appear to be in the stored position.

Accordingly, it is desirable to have a lip keeper style support system that will support a dock leveler ramp at a dock level position as well as at points below dock level.

SUMMARY OF THE INVENTION

The foregoing needs are met, to a great extent, by the present invention, wherein in one aspect an apparatus is provided that in some embodiments includes a dock leveler that is able to deal with the problems of free fall and stump-out while at the same time reducing the amount of labor and complexity of a dock leveler. In another aspect, an apparatus is provided that in some embodiments includes a dock leveler with a multi-tiered lip keeper support structure to support the ramp at the lip end when the ramp is substantially level with the surrounding dock floor or at one or more below dock positions.

In accordance with one embodiment of the present invention, a dock leveler is provided. The dock leveler includes a ramp configured to move between a raised and lowered position, a support leg configured to move between a support position supporting the ramp and a retracted position the support leg biased to the support position, and a support leg moving assembly configured to move the support leg to the retracted position when the ramp moves to the lowered position slower than a predetermined rate and not move the support leg to the retracted position when the ramp is moving toward the lowered position faster than a predetermined rate.

In accordance with another embodiment of the present invention, a dock leveler is provided. The dock leveler includes a ramp configured to move between a raised and lowered position, means for supporting the ramp configured to move between a support position supporting the ramp and a retracted position, the supporting means biased to the support position, and means for moving the supporting means configured to move the supporting means to the retracted position when the ramp moves to the lowered position slower than a predetermined rate and not move the supporting means to the retracted position when the ramp is moving toward the lowered position faster than a predetermined rate.

In accordance with yet another embodiment of the present invention, a method of operating a dock leveler is provided. The method includes biasing a support leg to a ramp supporting position, moving the support leg to a retracted position when the ramp descends slower than a predetermined speed, and maintaining the support leg in the supporting position when the ramp descends faster than a predetermined speed.

In accordance with yet another embodiment of the present invention, a method of operating a dock leveler is provided. The method includes biasing a support leg to a ramp supporting position, moving the support leg to a retracted position when the ramp descends slower than a predetermined speed and a lip associated with the dock leveler is in an extended position maintaining the support leg in the supporting position when the ramp descends faster than a predetermined speed.

In accordance with another embodiment of the present invention, a lip keeper support system for use with a dock leveler having a pivotal lip is provided. The system includes a lip holder comprising at least two lip supporting positions.

In accordance with another embodiment of the present invention, a lip keeper support system for use with a dock leveler having a pivotal lip is provided. The system includes a multi-tiered lip holder means for engaging the lip and supporting the dock leveler at more than one position.

In accordance with another embodiment of the present invention, a method of supporting a dock leveler having a lip pivotally mounted to a ramp is provided. The method includes securing a first lip engagement apparatus below the ramp in a location wherein the first lip engagement apparatus engages the lip when the lip is in a pendant position and the ramp is in a substantially dock level position, and securing a second lip engagement apparatus below the ramp at a location wherein the second lip engagement apparatus engages the lip if the lip should miss the first lip engagement apparatus and continue to a below dock level position.

In accordance with another embodiment of the present invention, a support system for supporting a dock leveler is provided. The support system includes; a support leg carrier pivotally attached to the ramp; a support leg attached to the support leg carrier and configured to move via the support leg carrier between a ramp supporting position and a retracted position; a cam attached to the support leg and biased to a first position. The system also includes a camming surface located below the ramp and positioned to communicate with the cam to guide the cam along the camming surface as the ramp descends, wherein the cam is configured to move to a second position when the ramp descends at or faster than a predetermined speed, wherein the support leg retracts when the cam maintains the first position while the cam moves along the camming surface and the support leg maintains the support position when the cam moves to the second position.

In accordance with another embodiment of the present invention, a dock leveler is provided. The dock leveler includes a ramp, a lip pivotally attached to the ramp, a lip holder comprising at least two lip supporting positions, wherein each of the at least two lip supporting positions is configured to engage the lip.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
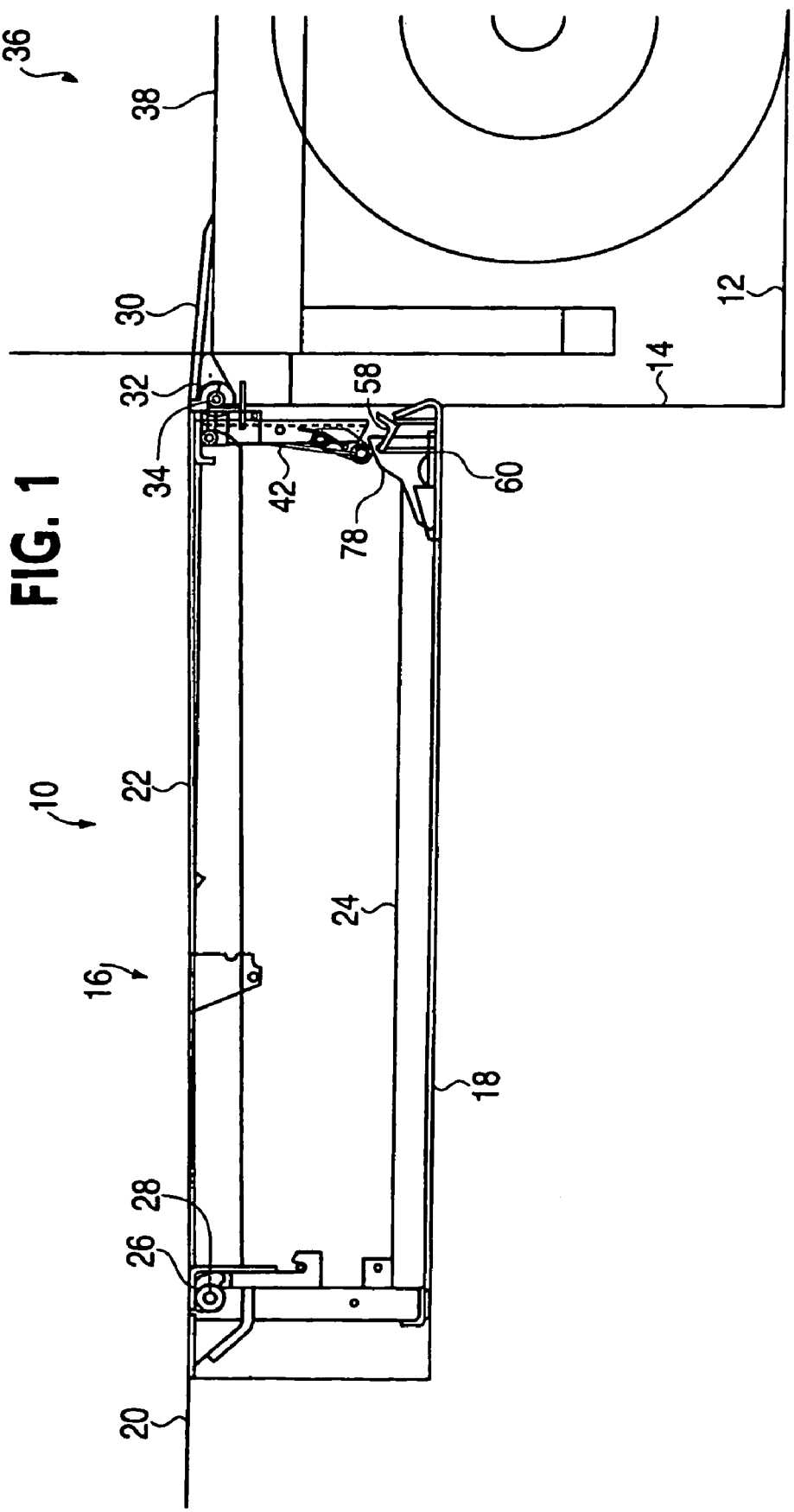
FIG. 1 is a side view illustrating a dock leveler according to a preferred embodiment of the invention.

The invention will now be described with reference to the drawing figures in which like reference numerals refer to like parts throughout. An embodiment in accordance with the present invention provides a dock leveler having support legs configured to support the ramp when the support legs are in a supporting position. The support legs are configured to retract allowing the ramp to move to a below dock level position. The support legs, when attached to a support leg moving assembly, are configured to move the support legs to a retracted position when the ramp moves to a lowered position at a relatively slow rate. For the purpose of this document, the lowered position of the dock leveler ramp is when the ramp is moved to the lowest position it can achieve. The support leg moving assembly is configured to not move the support legs to the retracted position when the ramp is moving to a lowered position at a relatively fast rate for example, when the ramp is in free fall.

The support legs move to a retracted position when the dock leveler ramp is being slowly moved to a below dock level position, yet if the ramp is in a free fall condition the support legs are left in the support position and thus minimizing the amount of free fall a ramp experiences. Permitting the support legs to maintain a supporting position when the ramp is in free fall can minimize the effect of free fall, yet allowing the support legs to be retracted when the ramp needs to achieve a below dock position can reduce the occurrence of stump-out.

Referring now to FIG. 1 a side view of a loading dock 10 is shown. In front of the loading dock 10 is a driveway 12 extending to a dock face 14. The dock leveler 16 is located in a recess in the dock 20 called a pit 18. The pit 18 is positioned below the surface 20 of the loading dock 10. A dock leveler 16 includes a deck or ramp portion 22. The deck or ramp 22 is attached to a frame portion 24 of the dock leveler 16 by a hinge 26 and one or more pins 28. At the other end of the ramp 22, a lip 30 is attached to the ramp 22 by a hinge 32 and one or more hinge pins 34. It is the lip 30 that engages a vehicle 36 and completes a bridge between the loading dock 10 and the bed 38 of a vehicle 36. The bridge permits material and material handling equipment such as fork lifts to go between the bed 38 of the vehicle 36 and the loading dock 10. The dock leveler 16 also includes support leg system 40 shown in FIG. 2.

Figure 2:
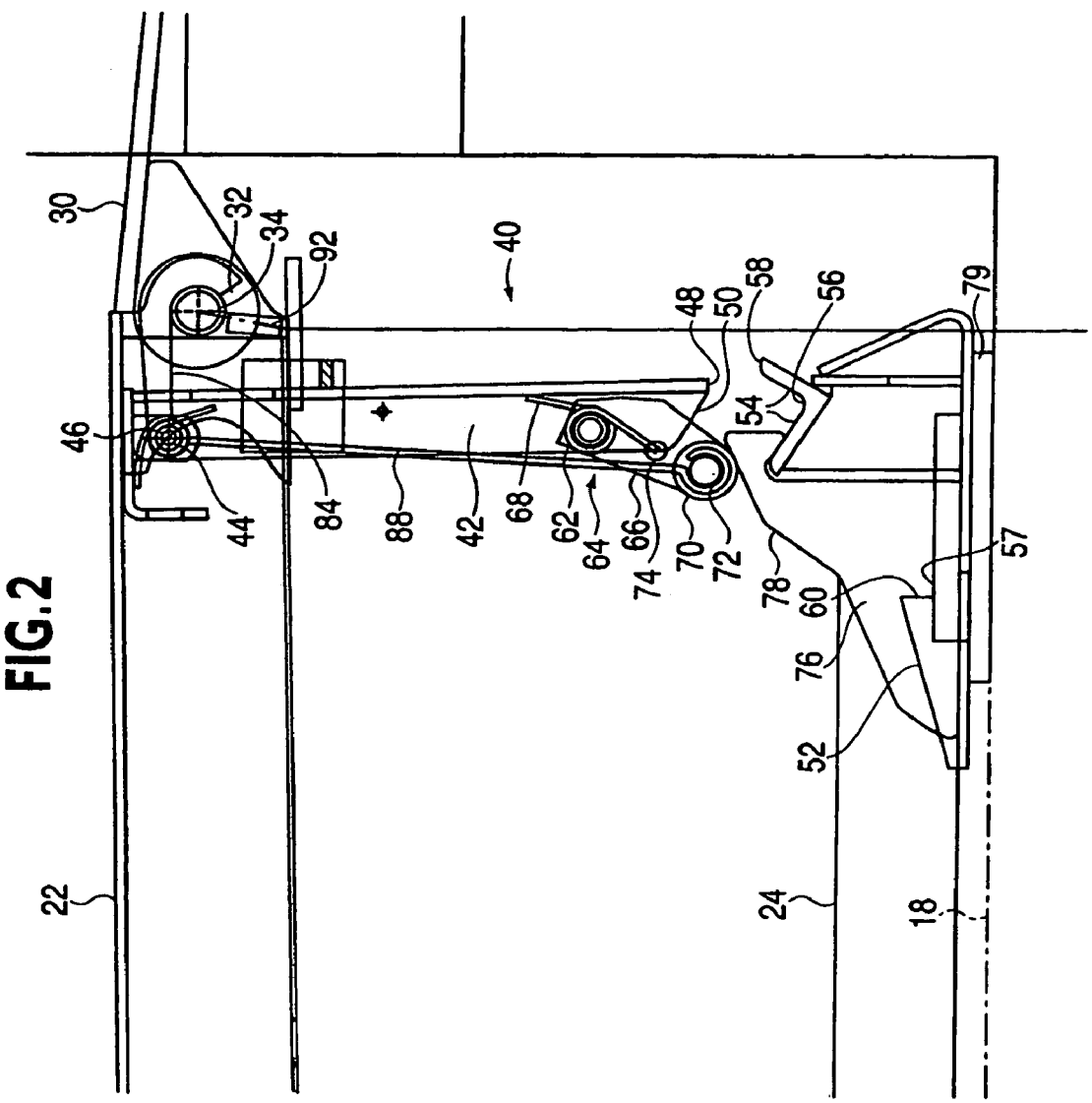
FIG. 2 is a side view of a support leg system for a dock leveler.
Figure 4:
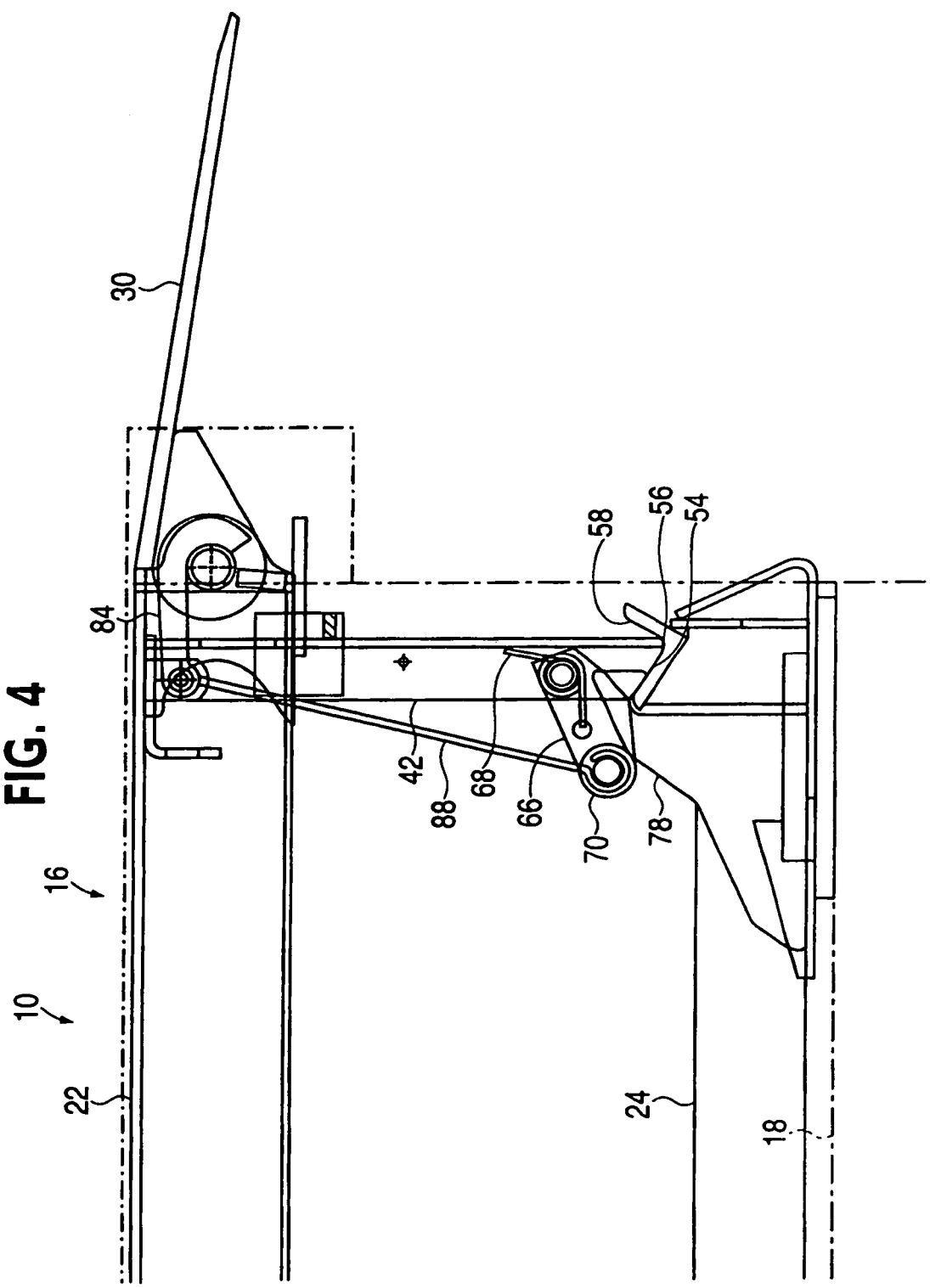
FIG. 4 is a side view of a dock leveler which has rapidly fallen and the support leg is supporting the ramp of the dock leveler.
Figure 6:
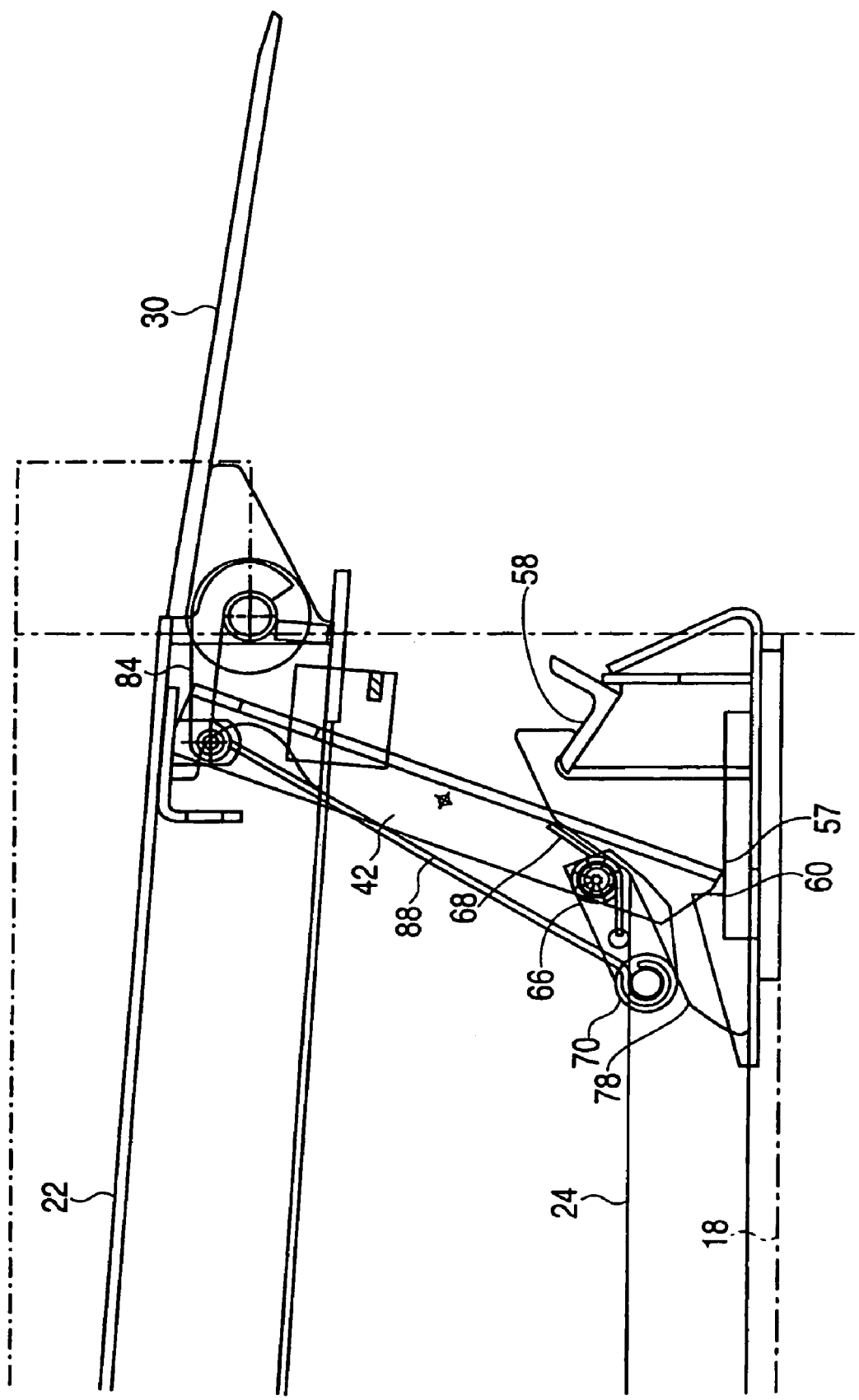
FIG. 6 is a side view of a dock leveler that has experienced a rapid fall after the support leg has started to retract and the support leg is in a secondary support position.

In the embodiment illustrated in FIG. 2 the support leg 42 is carried by a hinge assembly 44 attached underneath the deck 22. Some embodiments of the invention include two support legs 42 located parallel to each other at either side of the ramp. A spring 46 biases the leg 42 toward a support position. The support leg 42 has multiple support surfaces 48 and 50. The support surfaces interface with surfaces 52, 54, 56, 57 of support blocks 58 or 60. FIG. 4 shows the support leg 42 interfacing with the support surface 54 and 56 of support block 58. FIG. 6 shows the support leg 42 interfacing with the support surface 57 of support block 60.

Returning to FIG. 2, the support leg 42 has a pin 62 extending laterally that supports the cam roller assembly 64.

The cam roller assembly 64 is comprised of a cam arm 66, a biasing spring 68 and a roller cam 70. The roller cam 70 is attached to the cam arm 66 by a shaft 72. The cam arm 66 includes a hole 74 that acts as a place for the spring 68 to attach to on the cam arm 66. Attached to the dock leveler frame 24 is a support block 58 which includes a saddle portion 54 and 56 configured to support and/or align the support leg 42. A secondary support block 60 is also provided to support or align the support leg 42 when the support leg 42 has been partially retracted and no longer able to engage the first stop block 58. A plate 76 defining a camming surface 78 is also attached to the frame portion 24 of the dock leveler 16. The frame portion 24 of the dock leveler 16 is supported by a shim 79 that extends to provide support to the frame portion 24 supporting stop blocks 58 and 60.

The function of the cam roller assembly 64 is to move the support leg 42 to the retracted position when the ramp 22 is descending at a relatively slow speed. In other words when the dock leveler 16 is not in a free fall condition.

As the ramp 22 descends, the roller cam 70 engages the camming surface 78. As the ramp 22 continues to descend, the roller cam 70 continues to move along the camming surface 78. If the ramp 22 is moving downward at a relatively slow speed, then the spring 68 is able to urge the support leg 42 to rotate in a clockwise direction, or in other words, to a retracted position. However, if the ramp 22 is moving quickly in a downward direction, for example, in a free fall condition, then the roller cam 70 will move quickly down the cam surface 78. The spring 68 will not be able to quickly overcome the inertia associated with the support leg 42 and rotate the support leg 42 to the retracted position. Instead, the spring 68 will deflect, thus leaving the support leg 42 in a supporting position. Therefore, when the ramp 22 descends at a relatively slow rate of speed, the support leg 42 will retract. However, if the ramp 22 descends at a high rate of speed such as a free fall condition, the support leg 42 will remain in a supporting position.

The predetermined speed at which the support leg 42 will retract or stay in the support position will depend on the spring 68 and the weight and/or inertia associated with the support leg 42 and other variables associated with a particular installation. One skilled in the art will be able to make appropriate design choices to achieve the desired results of the invention. The spring 68 and support leg 42 and other factors specific to the installation should be considered and selected so that the support leg 42 stays in a support position when the ramp 22 is in free fall.

Figure 3:
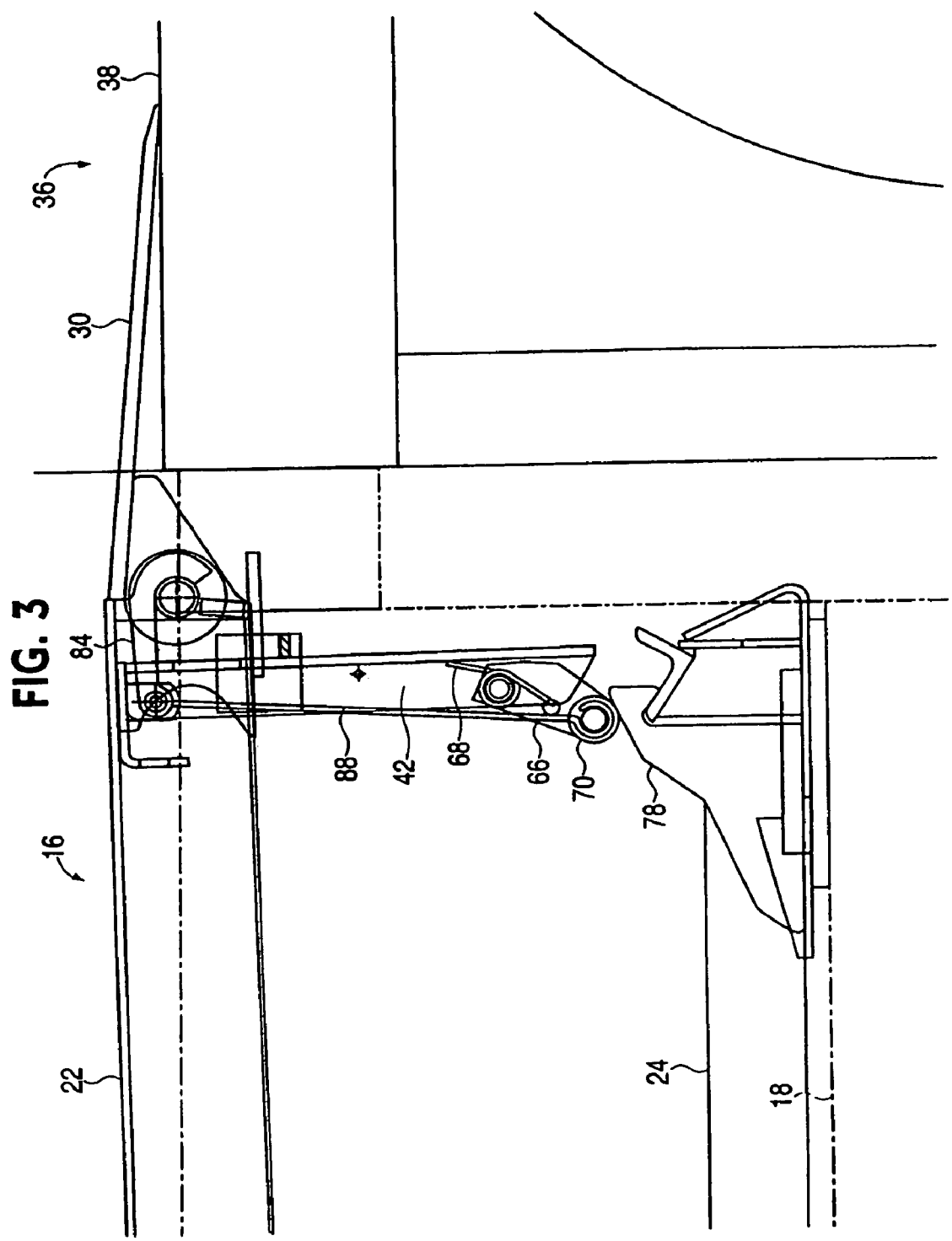
FIG. 3 is a side view of a dock leveler with a lip engaged with a vehicle bed and a roller cam engaging a camming surface.

FIG. 3 illustrates the dock leveler 16 engaging a vehicle 36.

FIG. 4 illustrates the support leg 42 in the support position when the ramp 22 has descended quickly. The spring 68 is deflected as the roller cam 70 is quickly moved on the camming surface 78 because the spring 68 is not able to quickly overcome the inertia of the support leg 42 and rotate it to a retracted position.

According to some embodiments of the present invention, the support leg 42 may be used to support the ramp 22 at the dock level position (i.e., when the ramp 22 is level with the surrounding loading dock 10). For example, in FIG. 4 the support leg 42 is engaging the first stop block 58 and the ramp 22 is at the dock level position. Storing the dock leveler 16 with a ramp 22 in the dock level position is a preferred mode of storage because it eliminates any tripping hazard created by a ramp 22 above or below dock level.

Figure 5:
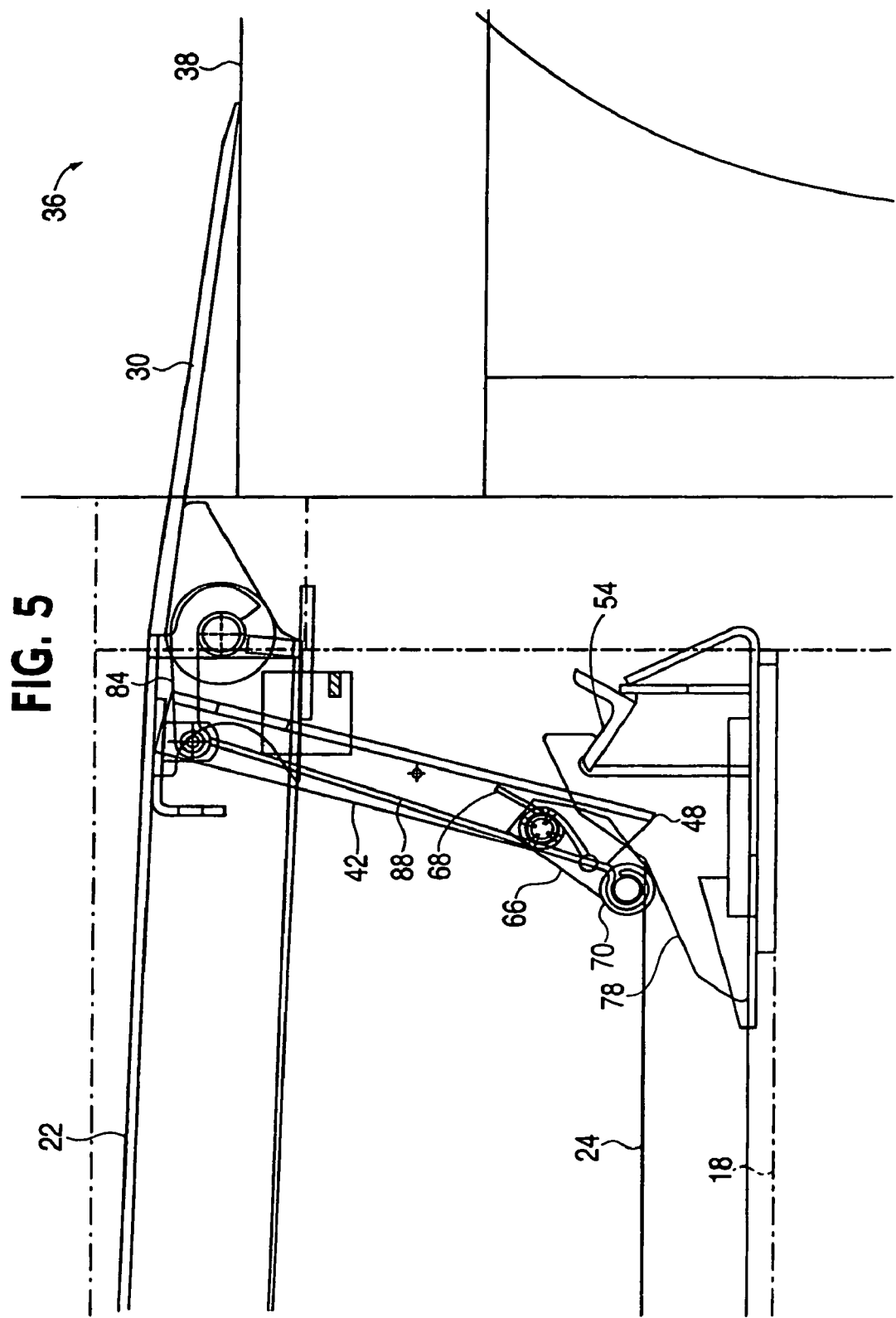
FIG. 5 is a side view of a dock leveler with the lip of the dock leveler engaged with a low vehicle bed and the support leg is in partially a retracted position.

FIG. 5 illustrates a condition where the ramp 22 starts to descend slowly and the roller cam 70 moves down the camming surface 78 and the spring 68 urges the support leg 42 to retract. Support surface 48 has moved to a position where further rapid decent if the ramp 22 can not be supported by support surface 54.

If, after the support leg 42 starts to retract due to a slow downward movement of the ramp 22, the ramp 22 then suddenly descends rapidly then the spring 68 will be deflected as the roller cam 70 is quickly moved on the camming surface 78 because the spring 68 is not able to quickly overcome the inertia of the support leg 42 and rotate it to a retracted position and thus, the support leg 42 engages in an intermediate support position as the spring 68 deflects. The intermediate support position is shown in FIG. 6. In FIG. 6 the support leg 42 has been retracted enough to not contact the first stop block 58 but instead contacts the second stop block 60.

Figure 7:
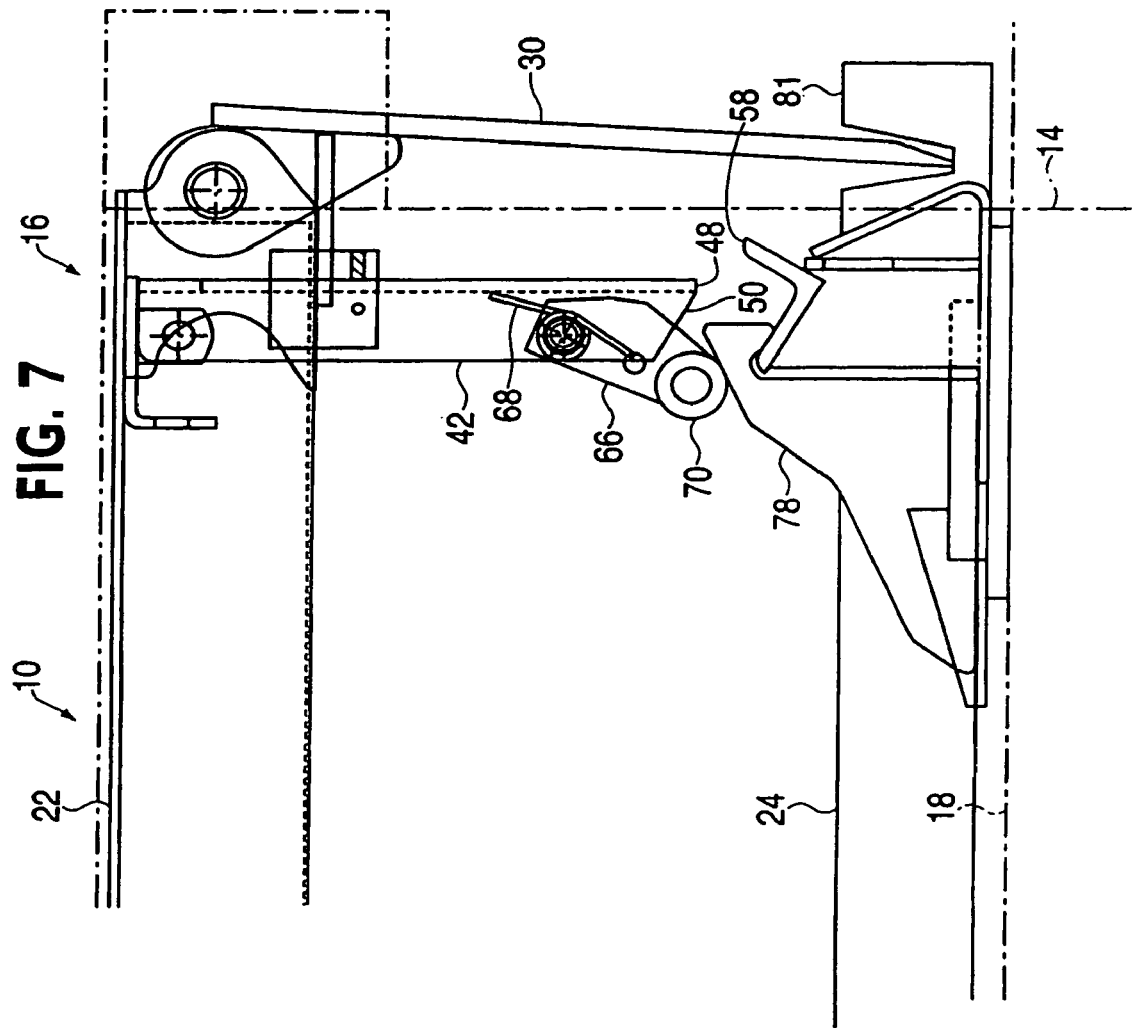
FIG. 7 is a side view of a dock leveler where the ramp is supported in the dock level position by a lip keeper.

In other embodiments of the present invention as shown in FIG. 7, the ramp 22 is supported in the level position by the lip 30 engaging a lip keeper 81. The lip keeper 81 may be attached to the frame 24 of the dock leveler 16 or to some other portion of the dock 10 or dock leveler 16 near the dock face 14. When the lip keeper 81 supports the ramp 22 in the level position, the support leg 42 may be dimensioned so that the support leg 42 does not contact the stop block 58 when the ramp 22 is in a level position.

Other embodiments of the present invention may include the support leg 42 attached to some other structure other than the ramp 22. For example, in FIG. 8 the support leg 42 is attached to a structure 80 which in turn is attached to the pit 18. The structure 80 may be attached to the pit 18 via a shim 81.

Figure 9:
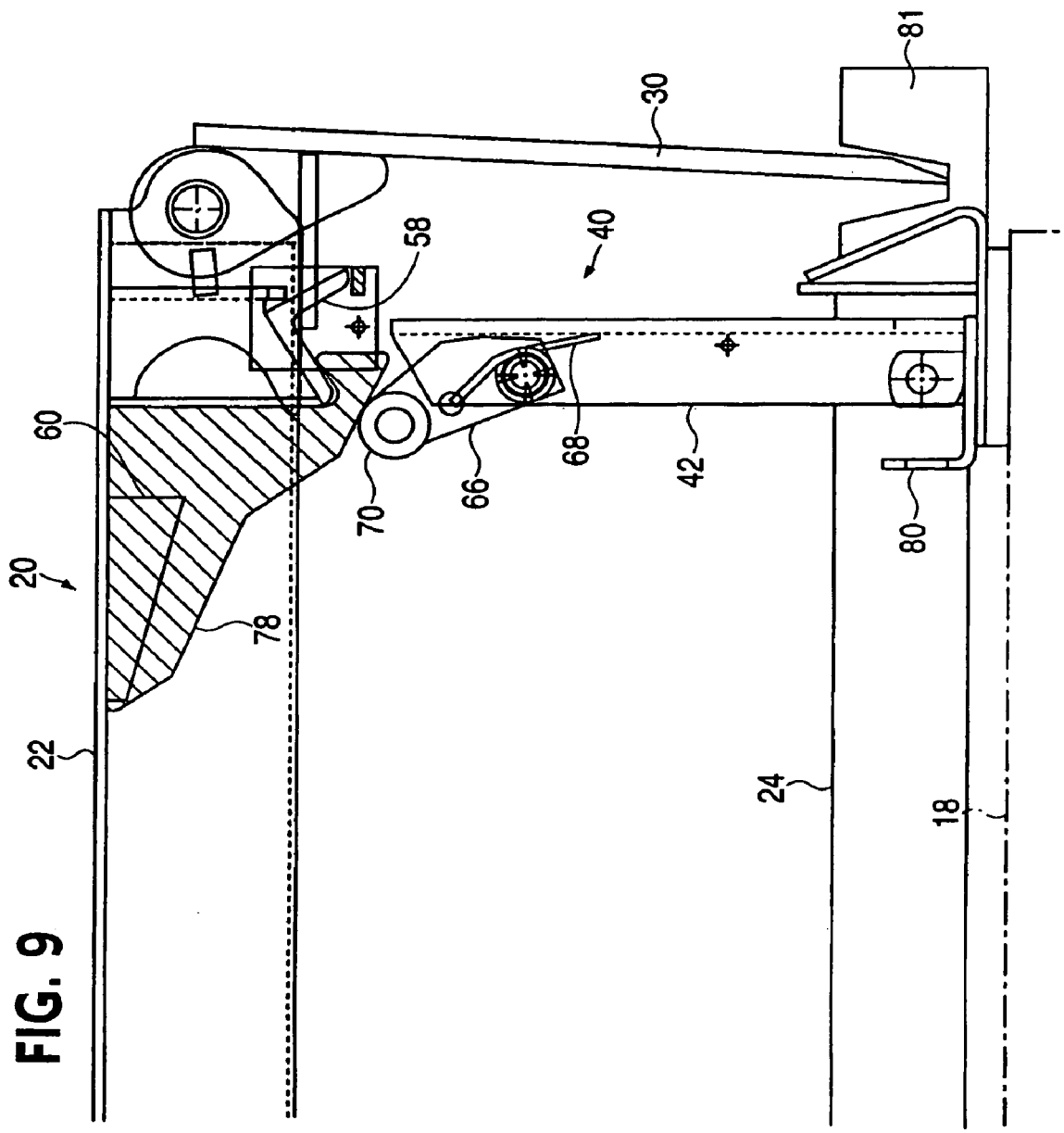
FIG. 9 is an embodiment of the present invention where the support leg is mounted in a pit portion of the dock and the ramp is supported by a lip engaging the lip keeper.

As shown in FIG. 9, other embodiments of the present invention may include attaching the support leg 42 to a frame portion 24 of the dock leveler 16. The stop 58 is attached to the under portion of the ramp 22. The camming surface 78 may also be attached to the underside of the ramp 22. The support leg 42 may be dimensioned to not contact the stop 58 when the ramp 22 is in a dock level position but rather a lip keeper 81 and the lip 30 may support the ramp 22 at the dock level position.

The support leg system 40 described herein generally provides for the support leg 42 to be a in support position when the ramp 22 descends rapidly, and the support leg 42 to be retracted when the ramp 22 descends slowly. There may be an occasion when it is desired to permit the support leg 42 to remain in the support position when the ramp 22 descends slowly. For example, when a dock leveler 16 no longer needs to be used, and stored with the ramp 22 in the level position, and the support leg 42, rather than a lip keeper 81 is used to support the ramp 22 in the level position, it may be desired to slowly move the ramp 22 from a raised position when engaging the vehicle 36 to a stowed or level position. Thus, a disengaging system 82 is provided to disengage the roller cam 70 from the camming surface 78, preventing the support leg 42 from retracting as the ramp 22 descends slowly.

Figure 10:
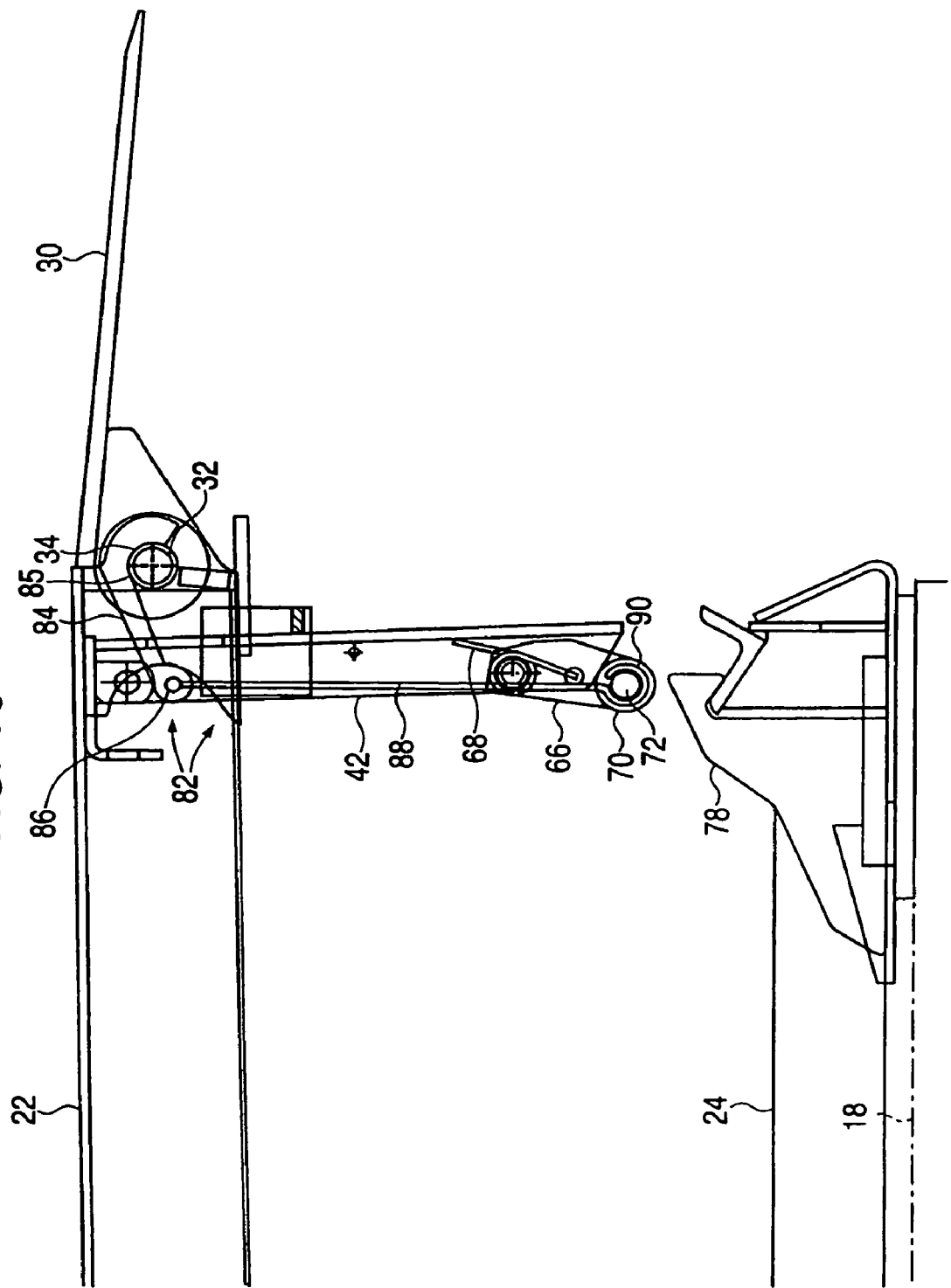
FIG. 10 is a side view of a dock leveler where the ramp is in a slightly inclined position such that the roller cam does not engage the camming surface.

As shown in FIG. 10 a disengaging mechanism 82 may be provided on the dock leveler 16 to disengage the support leg 42 retracting apparatus. The disengaging mechanism 82 shown in FIG. 10 includes an arm 84 connected to the lip hinge 32. The arm 84 is configured to pivot around the lip hinge pin 34. The lip hinge pin 34 may be encased in a tube 85, and the arm 84 will pivot around the tube 85. At the end of the arm 84 is a hole 86 which provides for a rod 88 to attach to the arm 84. The rod 88 also has a loop shaped end 90 which attaches around the shaft 72 of the roller cam 70. When the arm 84 pivots, it acts on the rod 88 which in turn acts on the shaft 72 to flex the spring 68 and move the roller cam 70 away from the camming surface 78.

Figure 11:
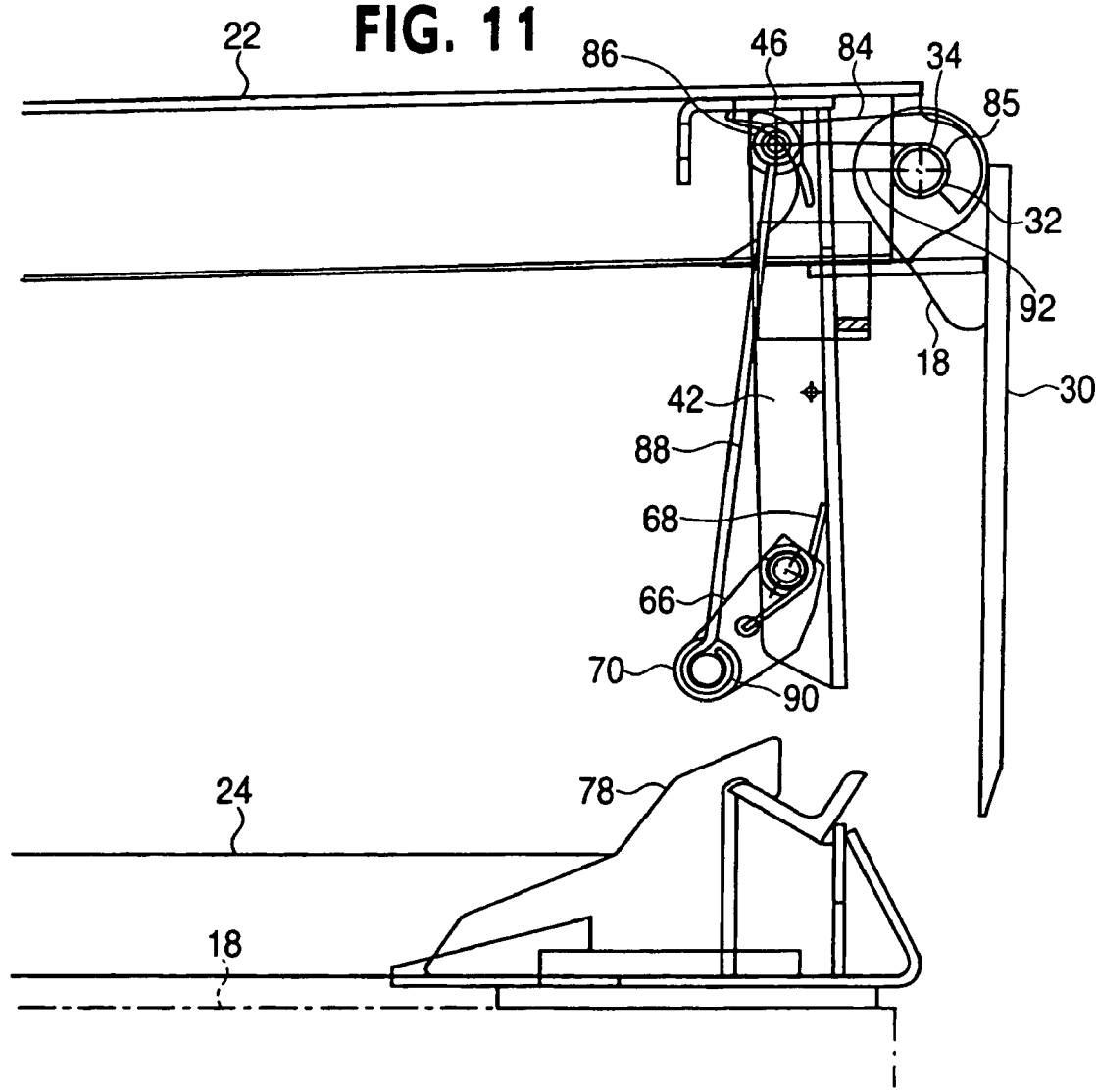
FIG. 11 is a side view of a dock leveler where the lip is in a pendant position preventing the roller cam from engaging the camming surface.

FIG. 11 shows the arm 84 pivoted and causing the roller cam 70 to be disengaged from the camming surface 78. A striker 92 located on the hinge 32 of the lip 30 contacts the arm 84 and causes the arm 84 to pivot when the lip 30 rotates to a pendant position as shown in FIG. 11. The striker 92 rotates clockwise and engages the arm 84 which in turn acts on the rod 88 pulling the roller cam 70 away from the camming surface 78, thus permitting the support leg 42 to maintain the support position and support the dock leveler ramp 22 when the lip 30 is in a pendant position.

Figure 8:
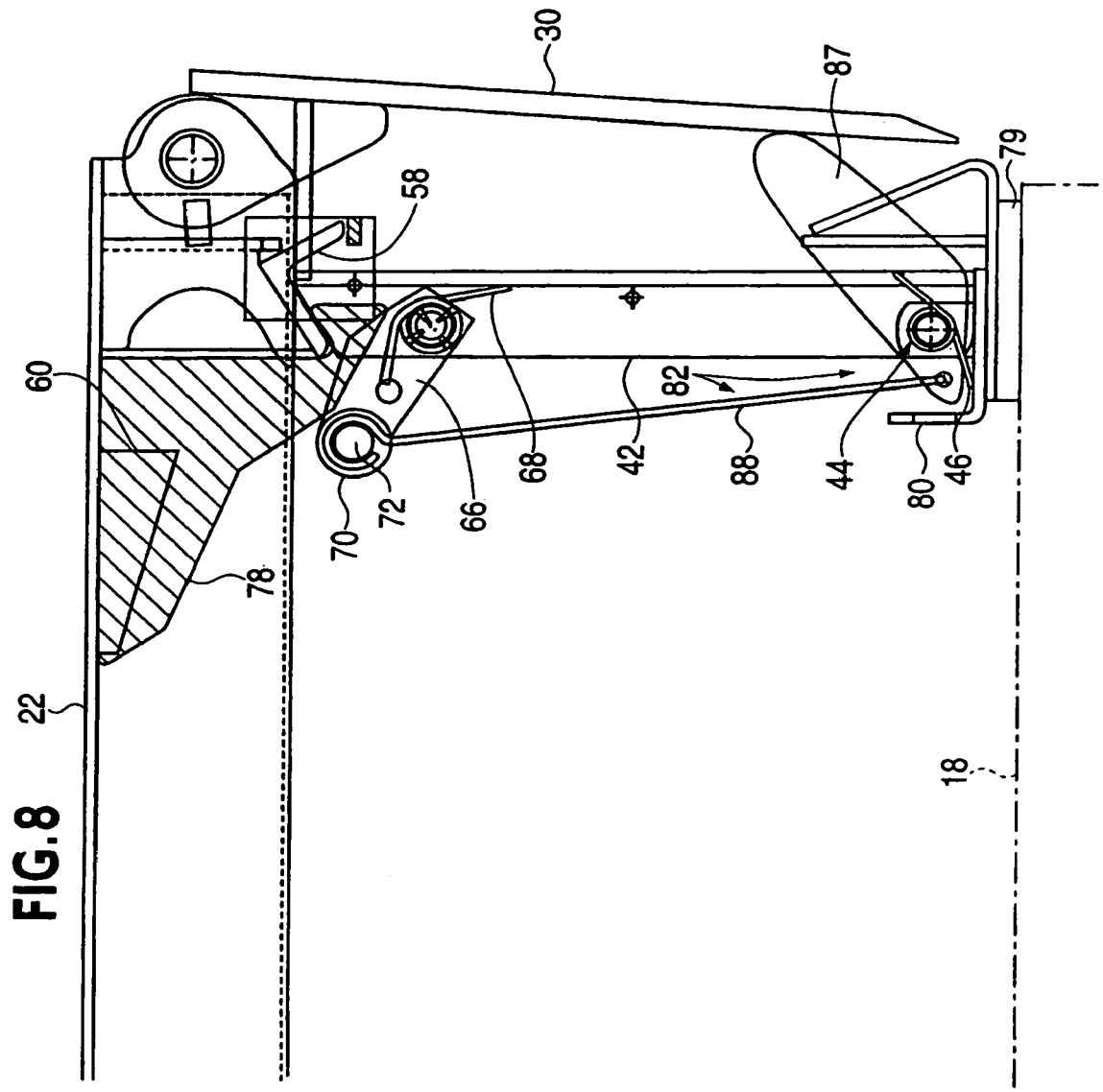
FIG. 8 is an embodiment of the invention where the support leg is mounted in the pit portion of the dock rather than to the ramp.

An alternate embodiment of the disengaging mechanism 82 is shown in FIG. 8. The disengaging mechanism 82 shown in FIG. 8 causes the support leg 42 to remain in the support position when the lip 30 is in a pendant position. The disengaging mechanism shown in FIG. 8 includes an arm 87 and a rod 88 attached around the shaft 72 of the roller cam 70. The disengaging mechanism 82 operates in a similar manner as described above, except that rather than a striker engaging the arm 84 to pivot the cam arm 66, the lip 30 directly contacts the arm 87 to pivot the cam arm 66 when the lip 30 is in a pendant position.

In the embodiments shown in FIGS. 8 and 11, the springs 46 and 68 are selected, and the arms 84 and 87 the rod 88 and the shaft 72 of the roller cam 70 are positioned, so that when the lip 30 is in a pendant position, the rod 88 pulls on the shaft 72 of the roller cam 70 and exerts a moment about the pivot point of the cam arm 66 strong enough to flex spring 68. A moment may also be exerted about the pivot point of the support leg 42 but it is not sufficient to flex spring 46. Thus, the spring 68 will deflect rather than spring 46, which will result in the support leg 42 not retracting. Although embodiments shown in the figures described herein use a roller cam 70 and camming surface 78 to retract the support leg 42 when the ramp 22 is descending in a slow manner, it would be appreciated by one skilled in the art that other items can be used.

Another embodiment of a support leg system according to the present invention is shown in FIGS. 12 through 17. In addition, an embodiment of a lip keeper support system according to the present invention is also shown in FIGS. 12–15 and 17. It should be noted, however, that lip keeper support systems in accordance with the present invention, including the lip keeper support system illustrated in FIGS. 12–15, and 17, need not be used with a support leg system, and if used with a support leg system, need not be used with the particular support leg system illustrated in FIGS. 12–17, but may be used with any of the other illustrated support leg systems or any other support leg system, whether or not in accordance with the present invention. Likewise, the support leg system illustrated in FIGS. 12–17 need not be used with a dock leveler that also includes a lip keeper support. That is, the support leg system of FIGS. 12 through 17 may be used independently of a lip keeper support and may provide the sole support for a dock leveler.

Figure 12:
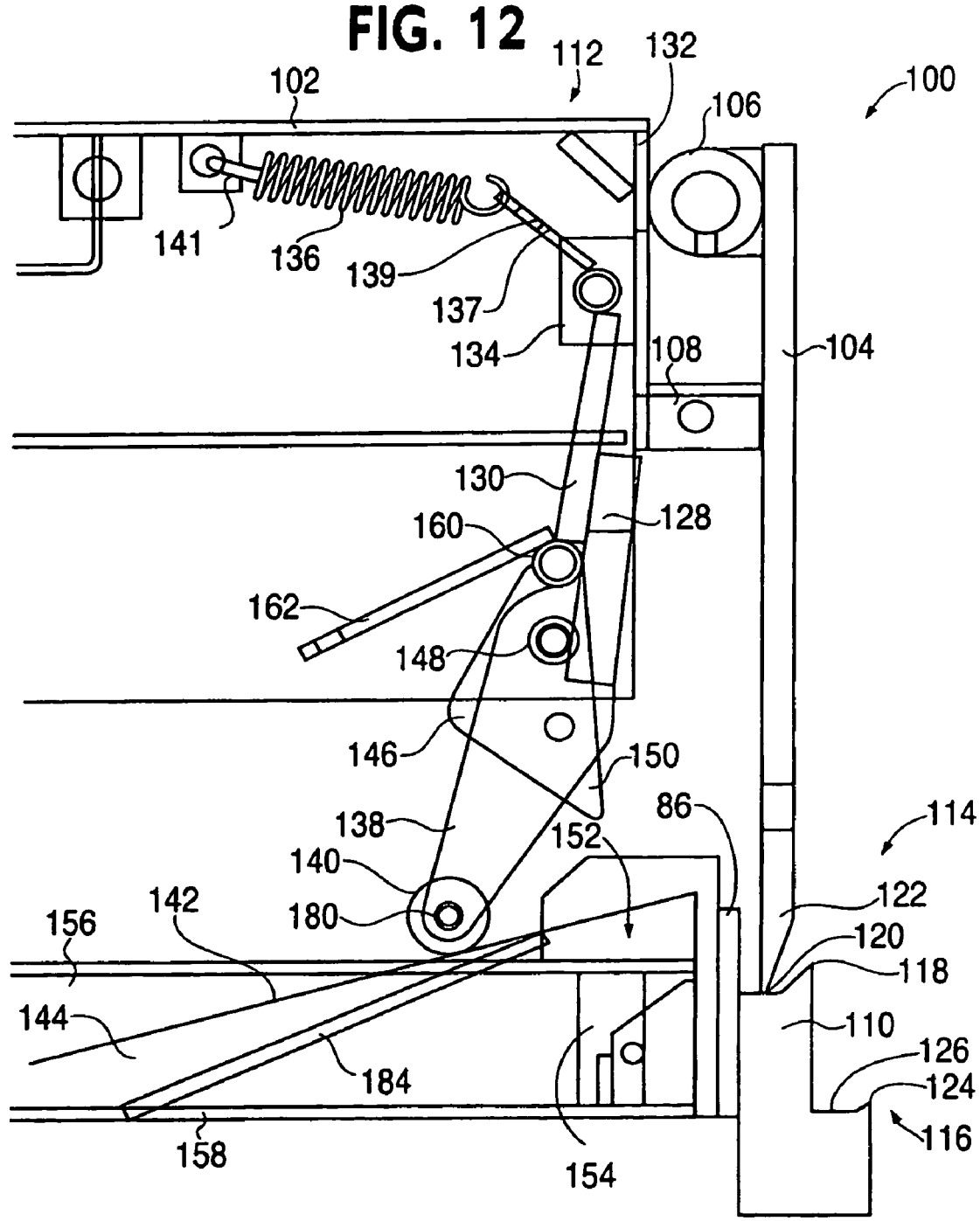
FIG. 12 is a side view of a dock leveler in accordance with the present invention showing a lip seated within a lip keeper and the lip supporting one end of the ramp.

FIG. 12 is a side view of a dock leveler 100 having a ramp 102 and a lip 104 connected to the ramp 102 by a hinge 106. The lip 104 pivots between a raised and lowered position. The lip 104 is stopped in its downward movement by a stop 108. The lowered position may also be referred to as the pendant position. The position shown in FIG. 12 is the pendant position.

According to the embodiment of the invention shown in FIG. 12, the lip keeper 110 supports the lip 104, which in turn supports the ramp 102 at the lip end 112. The lip keeper 110 is preferably multi-tiered so that it may support the lip, for example, at substantially dock level and at one or more points below dock level. It should be noted that whereas the specification illustrates multi-tiered lip keeper supports having positions for supporting the ramp at and below dock level, the invention also encompasses embodiments which could support the ramp at an above dock level position. Further, although the illustrated embodiment shows a single body defining two lip supporting positions, the invention also encompasses designs having more than one body, each defining one or more lip supporting positions. As well, the invention encompasses embodiments wherein the body carries one or more lip supporting positions. In other words, the lip supporting position may be a separate structure attached to or coupled to the body.

In the illustrated embodiment, the lip keeper 110 has two positions, a first support position 114 and a second support position 116. In embodiments including only two positions, the first support position 114 preferably supports the ramp at about dock level and the second support position 116 preferably supports the ramp at a position of about 2.5 inches below dock level. This arrangement is preferable because if the leveler appears supported at dock level but is actually just below the dock leveler support position 114, the maximum distance the leveler may unexpectedly fall if a dock worker walks or drives out onto the ramp is 2.5 inches. Additionally, the if the leveler is supported in position 116 or unsupported in a position lower than position 116, the dock worker can visually see the unit is not at dock level and should re-store the leveler to dock level support position 114.

The first support position 114 has a raised portion 118 and a recessed portion 120. When the lip 104 is in the first support position 114, the tip 122 of the lip 104 rests in the recessed portion 120 of the lip keeper 110. The raised portion 118 aids in preventing the tip 122 of the lip 104 from slipping out of the first supporting position 114 when load is placed on the ramp.

A second support position 116 is provided on the lip keeper 110. The second support position 116 is configured to support the lip 104 should the lip 104 achieve the attitude shown in FIG. 13 where the lip 104 misses the first support position 114.

The second supporting position 116 includes a raised portion 124 and a recessed portion 126. While the two support positions 114,116 show a substantially flat recessed portion 120, 126 and corresponding raised portion 118, 124, the invention is not limited to lip keeper supports having that particular profile. For example, other embodiments of the invention may use support positions 114, 116 with a U-shape or profile, a V-shaped profile, an L shaped profile, or any other suitable profile. Further, although the illustrated embodiments show a single-body lip holder wherein the recessed portion and raised portion are on the same body, in fact the recessed portion and raised portions may be on separate bodies. For example, a first tier of the lip holder may include three bodies, a first and second level body (i.e. without a raised portion) located at either side of the dock leveler, and a third body, which is the raised portion (for example, a pipe attached to the dock leveler at an upwardly inclining angle) in the middle of the dock leveler. Preferably for neutrally biased dock levelers, any profile suitable for retaining the tip 122 of the lip 104 when the ramp is loaded, whether accomplished by a one or more bodies, may be used in accordance with the invention.

As shown, the second support position 116 is located below and outwardly or outward along a substantially horizontal line from the first support position 114. The second support position 116 is located this way so that it may support the lip 104 should the lip 104 miss the first support position 114.

Preferably, the lip keeper 110 will be used with mechanical style dock levelers that have a neutral bias. However, the use of the lip keeper 110 is not limited to mechanical dock levelers but may be used with for example, hydraulic, power-assisted or pneumatic-driven dock levelers. One reason it may be preferable to use the lip keeper 110 with a neutrally biased mechanical dock leveler is, as previously indicated, because it may be possible for the leveler to be in a substantially horizontal storage position or appear to be in a substantially horizontal storage position (but in fact be at a below dock position) and yet not be supported by the lip and lip keeper.

Figure 14:
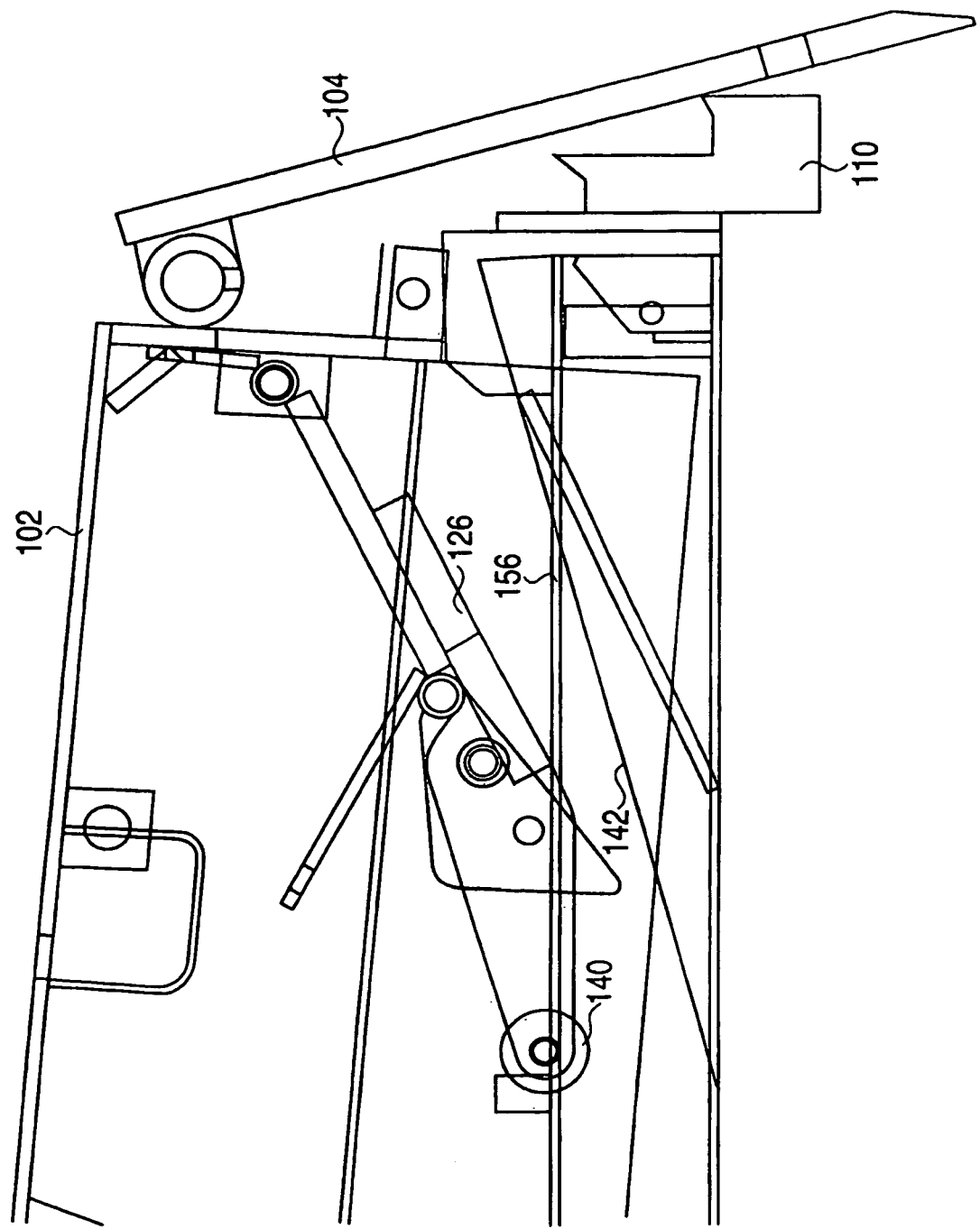
FIG. 14 is a side view of a dock leveler in accordance with the invention where the ramp is at its lowest position and the lip has missed the lip keeper.
Figure 14A:
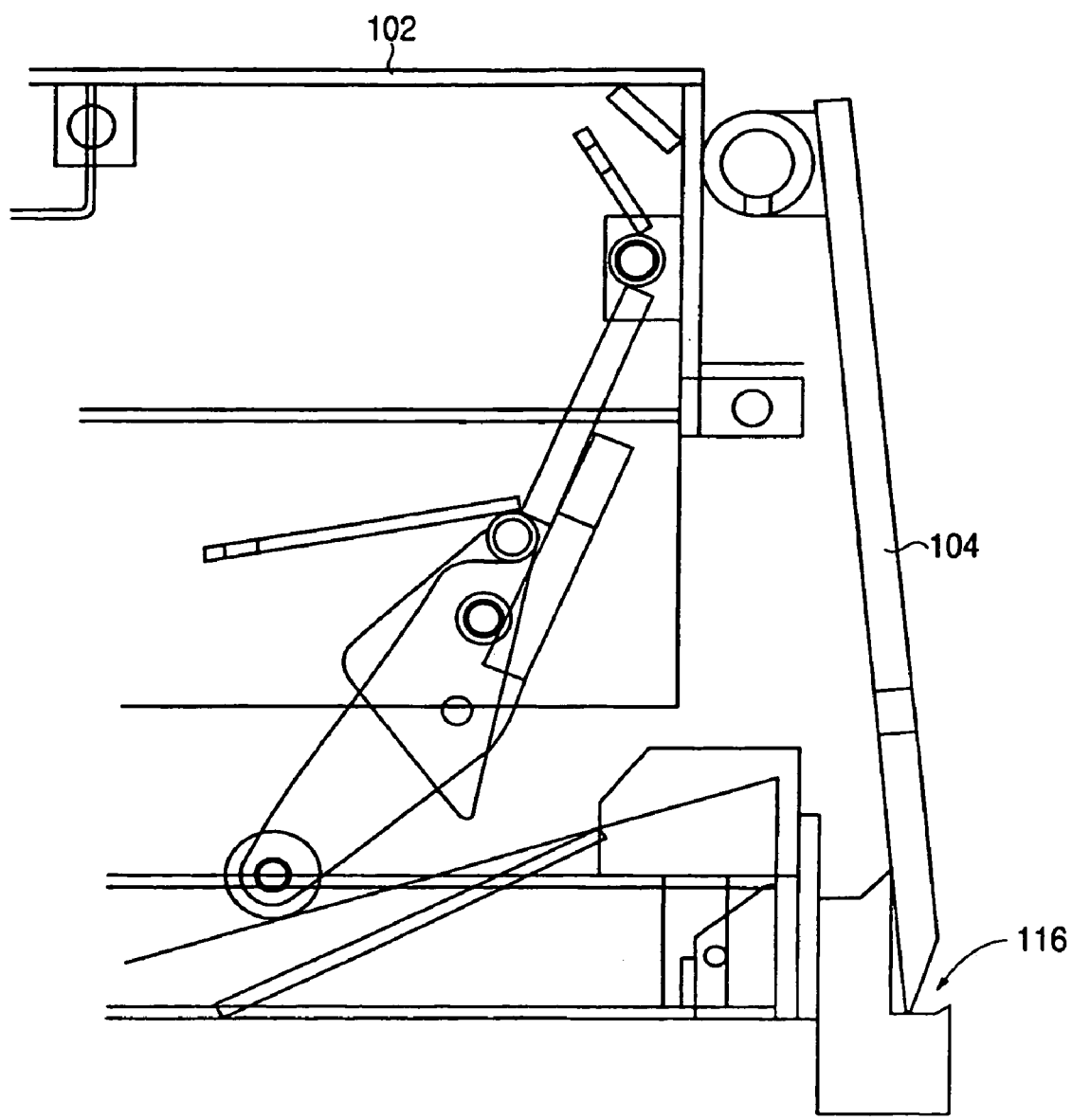
FIG. 14a is a side view of a dock leveler in accordance with the invention where the lip is seated within a lip keeper in the second supporting position and the lip keeper is and lip is supporting one end of the ramp.

Preferably, the position of the of the final tier of the multi-tiered lip keeper is chosen such that if the lip 104 and ramp 102 achieve the position shown in FIG. 14a, a dock worker would notice that ramp 102 a dock worker would notice that the ramp 102 is located lower than the level position of the surrounding dock floor and would restore the leveler to a properly stored, dock level position. In the case of the illustrated embodiment, the final tier is a second tier, however, the multi-tiered lip keeper may have more than two tiers, in which case the final tier would not be the second tier.

In some embodiments, the position of the final tier of the multi-tiered lip keeper is chosen such that if the lip 104 and ramp 102 achieve the position as shown in FIG. 14 where the lip 104 is located outwardly and out of the lip support 110, that is out of the final tier of the lip support 110, a dock worker viewing the ramp 102 would notice that the ramp 102 is located lower than the level position or the level of the surrounding dock floor and would know that the lip end 112 of the ramp 102 was not supported and would not walk on or drive over the ramp 102.

According to some embodiments of the present invention, the lip keeper feature 110 of the dock leveler 100 may be used in combination with support legs as described above and shown in FIGS. 1 through 11 or other types of support legs such as those shown in FIGS. 12–17 and described below. The support legs described above and below and shown in FIGS. 1 to 15 are merely meant to be examples of support legs that may be used in combination with the multi-tiered lip keeper support, and are not meant to be limit the invention to only the types of support legs shown and described. Some embodiments may not use support legs at all. Further, as previously indicated, although the support leg embodiment illustrated in FIGS. 12–17 is shown used in combination with a lip keeper support, the support leg embodiment of FIGS. 12–17 may be used with other lip keeper supports, or may be used independently. In other words, the support leg embodiment of FIGS. 12–17 need not be used in combination with a lip keeper support system. Generally, any and all leg support systems in accordance with the present invention may be used independently, or may be used in combination with a lip keeper support system, including the multi-tiered lip keeper support system of the present invention. Further, whereas the multi-tiered lip keeper is preferably used in combination with a mechanically-operated dock leveler, the support leg of FIGS. 12 through 17 is preferably used with any type of dock leveler, including a mechanically-operated dock leveler as well as a power-assisted dock leveler.

Figure 13:
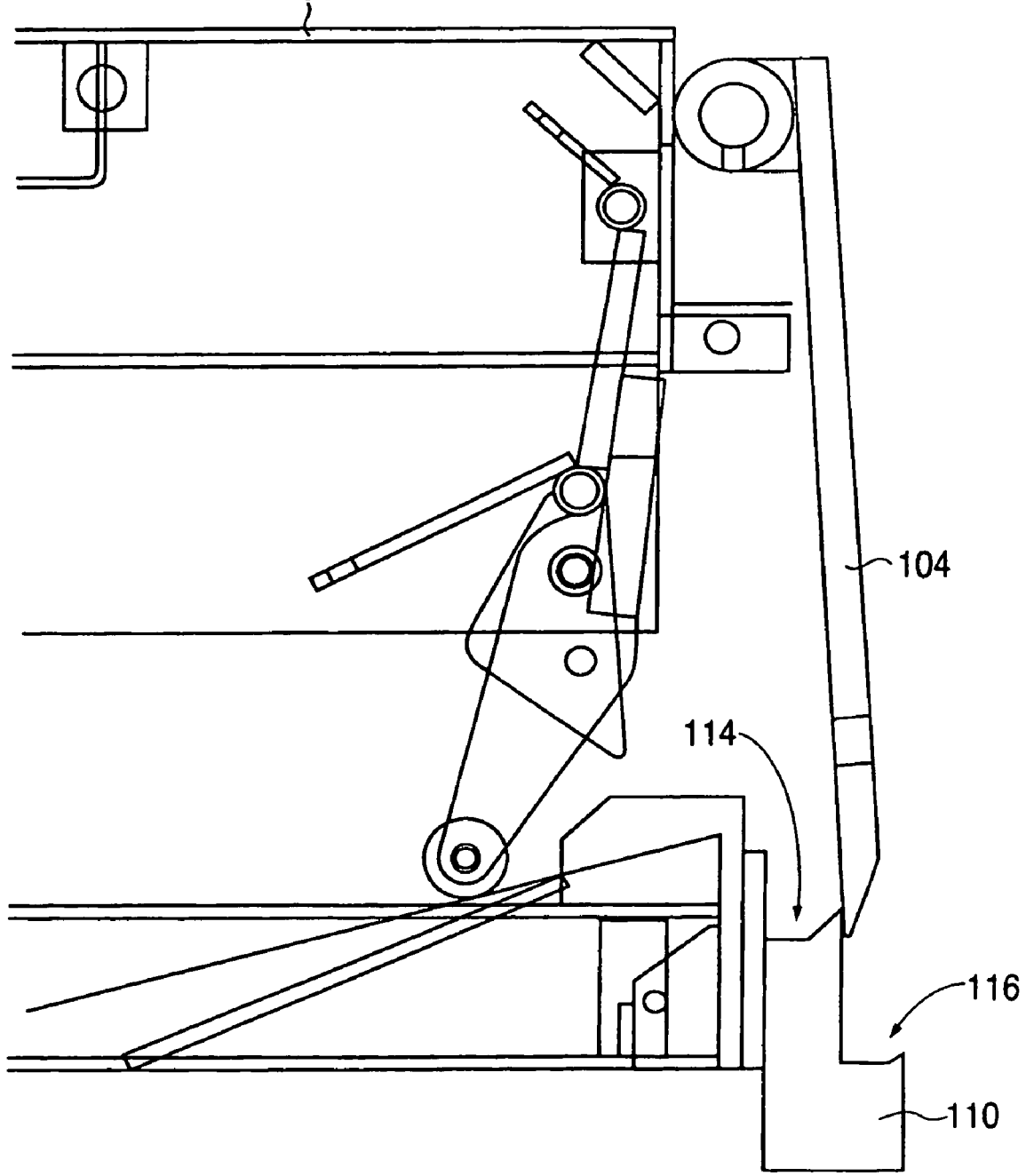
FIG. 13 is a side view of a dock leveler in accordance with the invention showing the lip missing a first supporting position of the lip keeper and the lip nearly seated in a second position of the lip keeper.
Figure 15:
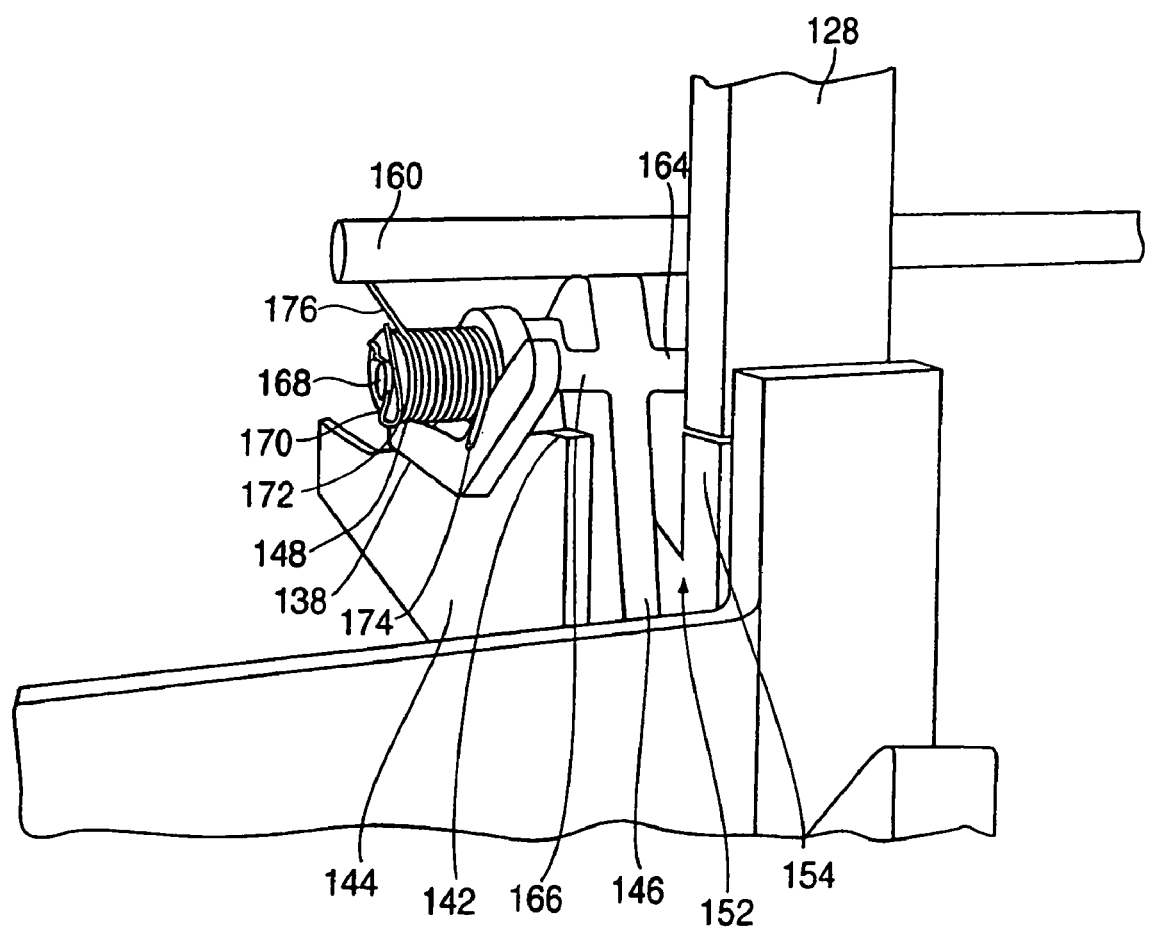
FIG. 15 is an isometric view of a support leg in accordance with the present invention.

FIG. 12 shows a support leg 128 that is carried on a support leg carrier 130 that is pivotally attached to a header 132. The header 132 is a beam running across and beneath the dock leveler ramp 102. The support leg carrier 130 is attached to the header 132 via a leg mount 134. Attached to the leg mount 134 is a spring bar 137 having a hole 139. The hole 139 on the spring bar 137 provides a place to attach a tension spring 136. The tension spring 136 also attaches to a spring lug 141 attached to the ramp 112. The tension spring 136 biases the support leg 128 and the support leg carrier 130 to a forward position (the forward position is shown in FIG. 15). The position of the support leg 128 shown in FIGS. 12 through 14 show the support leg 128 in various retracted positions. The forward position is also sometimes referred to as the support position. The fully retracted position, as shown in FIG. 14, is sometimes referred to as the retracted position, whereas the various retracted positions of FIGS. 12 and 13 are sometimes referred to as intermediate positions.

It is occasionally desirable to retract the support leg 128. The support leg 128 will retract when the ramp 102 is descending below a predetermined rate. To retract the support leg 128, a cam plate 138 is equipped with a cam 140 configured to communicate against the camming surface 142 defined by camming plate 144. In FIGS. 12–15 a roller cam is shown, however, other types of cams may be used. In addition, the cam plate 138 may itself serve as the cam 140. The cam plate 138 is pivotally attached to a catch plate 146. The catch plate 146 is attached to the support leg 128. A torsion spring 148, best shown in FIGS. 15 and 16, biases the camming plate 138 to a first position (positions shown in FIGS. 12 through 14).

When the ramp 102 descends slower or below a predetermined rate, the forces acting upon the torsion spring 148 are not great enough to deflect the torsion spring 148. Rather the cam plate 138 and cam will move down along the camming surface 142, which will, in turn, retract the support leg 128. Should the ramp 102 descend at or faster than a predetermined rate, then the friction and inertia associated with the cam 140 and cam plate 138 will be great enough to deflect the torsion spring 148 and cause the cam plate 138 to deflect and move to a deflected position (the position shown in FIG. 15) rather than move along the camming surface 142.

A catch plate 146 is mounted to the support leg 128 and configured to catch the support leg 128 into a supporting position (the supporting position is shown in FIG. 15) when the ramp 102 falls at or faster than a predetermined rate. When the ramp 102 falls at or faster then the predetermined rate, the torsion spring 148 will deflect and move the cam plate 138 to a deflected position (shown in FIG. 15).

Figure 17:
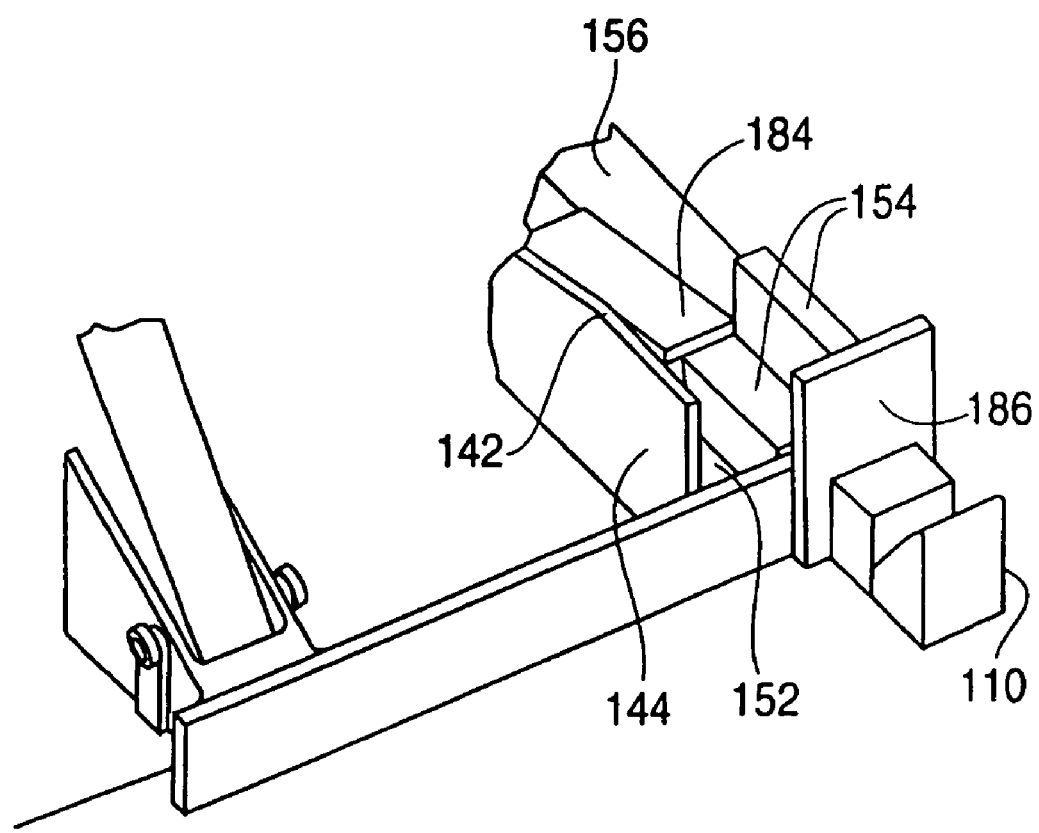
FIG. 17 is an isometric view of a camming surface and support structure located under the ramp in a dock leveler in accordance with the present invention.

The catch plate 146 has a catch 150 which will fit into a catch hole 152. When the catch 150 is inserted into the catch hole 152, then the support leg 128 and the support leg carrier 130 will support the lip end 112 of the ramp 102. In some embodiments of the invention, the support leg 128 and the catch plate 146 and catch 150 will be dimensioned and configured in order to have the lip stop 108 rest upon one end of the support leg 128 and the other end of the support leg 128 will rest upon a support lug 154 (shown in FIGS. 15 and 17). The support lug 154 may be mounted either to the frame 156 of the dock leveler 100 as shown in FIGS. 15 and 17, or the pit 158 in which the dock leveler 100 is mounted.

According to some embodiments of the invention, a crossbar 160 may connect one support leg 128 to another support leg. According to some embodiments of the invention, the crossbar 160 will connect the support leg 128 to a second support leg (not shown) mounted similarly to the support leg 128. The crossbar 160 will permit two support legs 128 to be operated by a single cam plate 138, cam 140 and catch plate 146. A retracting plate 162 maybe attached to the crossbar 160 and be connected to a chain or other device (not shown) for manually retracting the support leg 128. Other embodiments of the invention may have two support legs as mentioned above, but the second support leg may be activated by a second cam plate, cam, and catch plate.

FIG. 13 shows the ramp 102 and in a slightly below dock position where the lip 104 has missed the first support position 114 and is about to achieve the second position 116 of the lip keeper 110.

FIG. 14 shows the lip 104 missing the lip keeper 110 entirely and the ramp 102 is in a substantial downward slope toward the lip end 112 of the ramp 102. The cam 140 is no longer in contact with the camming surface 152 because as the support leg 128 retracts, at a certain point, the support leg contacts a part of the dock leveler frame 156 and moves along the dock leveler frame 156. Thus, as shown in FIG. 14, the support leg 128 rests on the dock leveler frame 156 when the support leg 128 is in the retracted position. Other embodiments of the invention may include the cam 140 resting on the camming surface 156 when the support leg 128 is in the retracted position or other suitable configurations.

FIG. 15 is a detailed close-up view of the support leg 128 nearly contacting the supporting lug 154. The catch plate 146 has engaged the catch hole 152 via the catch 150. The catch plate 146 is connected to the support leg 128 by a shaft 164. A second shaft 166 connects the catch plate 146 with the cam plate 138.

In FIG. 15, the cam plate 138 is shown in a deflected position where the torsion spring 148 has deflected because the ramp 102 has lowered at or faster than a predetermined rate. The cam plate 138 is pivotally connected to the catch plate 146. A shaft 168 extends from the cam plate 138. The torsion spring 148, is mounted around the shaft 168. A cotter pin 170 keeps the torsion spring 148 in place with a washer 172 separating the torsion spring 148 and the cotter pin 168. The torsion spring 148 is attached to the cam plate 138 by having one end 174 of the torsion spring 148 extend through a hole in the cam plate 138. This arrangement permits the torsion spring 148 to urge against the cam plate 138. Other embodiments of the invention may include using some other suitable means that allows the spring's end 174 to be attached to and urge against the cam plate 138. The other end 176 of the spring is urging against the crossbar 160, thus biasing the cam plate 138 to the first position shown in FIGS. 12 through 14.

Figure 16:
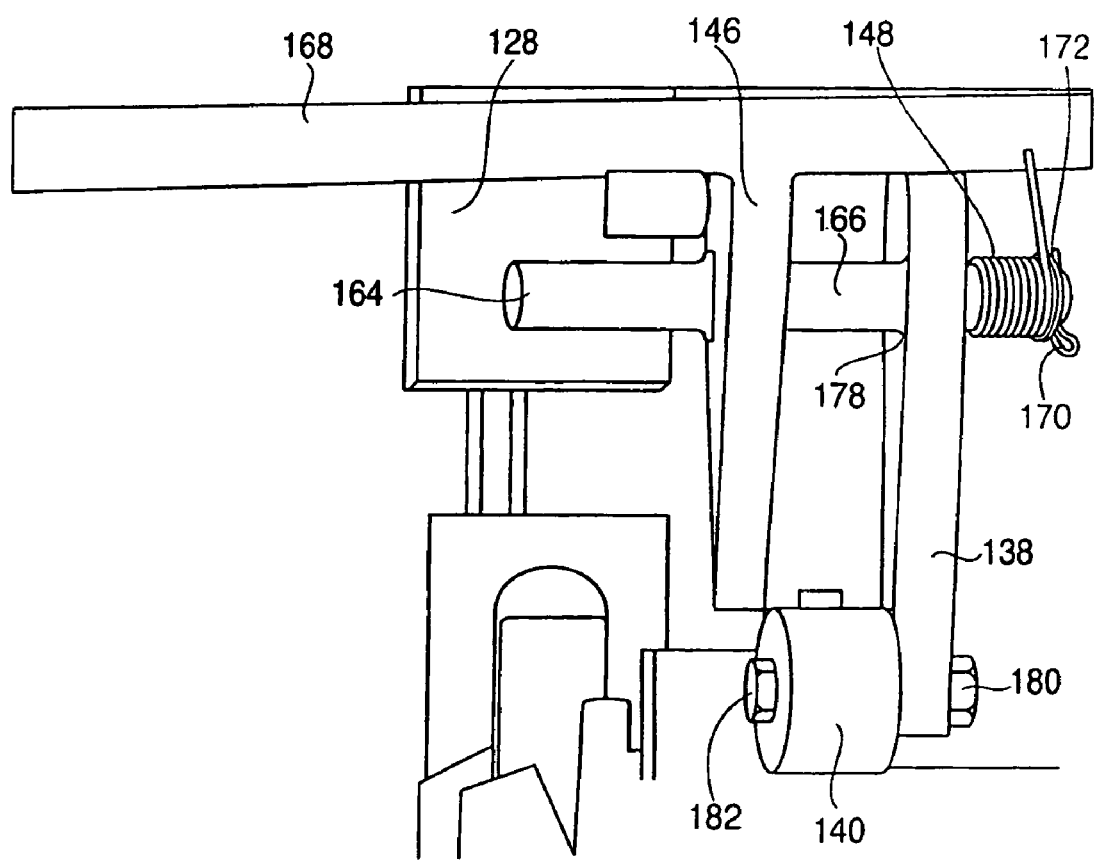
FIG. 16 is a view from under the ramp looking out of a support leg in accordance with the present invention.

FIG. 16 is a view from under the ramp 102 looking outward. The crossbar 160 is attached to the support leg 128 by welding. The torsion spring 148 urges against the crossbar 160 to bias the cam plate 138 to the first position. The catch plate 146 is welded to the crossbar 160 and is also welded to a shaft 164. The shaft 164 is also welded to the support leg 128. A second shaft 166 connects the catch plate 146 to the cam plate 138. The cam plate 138 pivots around the shaft 166. A washer 178 is welded to the shaft 166 which limits the movement of the cam plate in one direction along the shaft 166. A second washer 172, in combination with the cotter pin 170, limits both the spring 148 and the cam plate 138 from the movement along the shaft 166. The cam 140 is a roller cam and is held in place by two bolt heads 180 and 182.

FIG. 17 shows a structure located below the ramp 102 and attached to the dock leveler frame 156 located on the pit 158. A spacer 184 spaces the camming plate 144 from the frame 156. In some embodiments of the invention, the spacer 184 acts as a catch bar to catch the tip 150 of the catch plate 146. It is the camming plate 144 that provides the camming surface 142. The lip keeper 110 is welded to a lip keeper plate 186 which, in turn, is welded to the frame 156 of the dock leveler 100. Support lugs 154 are attached to the frame 156 and are configured to engage the support leg 128 (not shown in FIG. 17). In some embodiments of the invention, the spacer 184, the camming plate 144 and the frame 156 define the catch hole 152, which is configured to catch the catch plate 146 tip 150.

Figure 18:
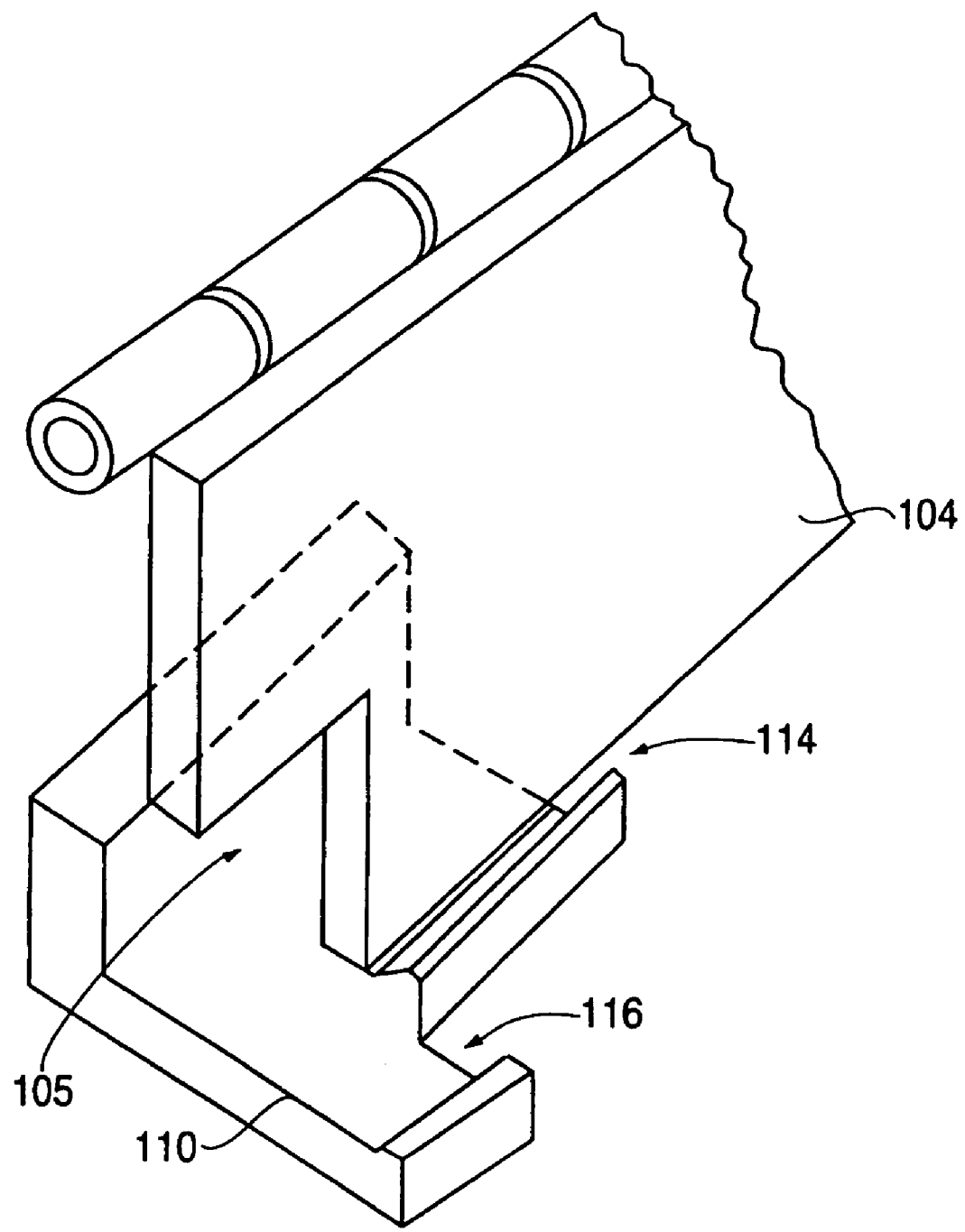
FIG. 18 is an isometric view of an alternate embodiment of a lip keeper and corresponding lip in accordance with the current invention.

FIG. 18 shows an alternate embodiment of the invention. The lip keeper 110 as two support positions 114 and 116. One support position 116 is located outward from the other support position 114. The lip 104 has a recessed portion 105. The recessed portion 105 permits a portion of the lip 104 to travel below the lip keeper 110 before another portion of the lip 104 contacts the lip keeper 110. If the lip 104 has missed the support position 114, and the lip 104 starts to travel downward, the lip 104 will contact the lip keeper 110 at the support position 116 provided that the lip 104 is not extended out too far toward the extended position.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A lip keeper support system for use with a dock leveler having a pivotal lip, comprising:
   a lip holder comprising at least two lip supporting positions wherein each of the at least two lip supporting positions, when fully engaged by the lip, stops downward travel of the lip.

2. A lip keeper support system according to claim 1, wherein the lip holder further comprises at least one body defining or carrying at least one lip supporting position.

3. A lip keeper support system according to claim 2, wherein the at least one body is at least a first body and a second body, the first body defining or carrying a first lip supporting position and the second body defining or carrying a second lip supporting position.

4. A lip keeper support system according to claim 2, wherein the at least one body defines or carries at least two lip supporting positions.

5. A lip keeper support system according to claim 1, wherein at least one of the at least two lip supporting positions defines or carries a lip retaining portion.

6. A lip keeper support system according to claim 5, wherein each of the at least two lip supporting positions defines or carries a lip retaining portion.

7. A lip keeper support system according to 5, wherein the at least one of the at least two lip supporting positions includes a raised area and a recessed area, and wherein the raised area is the lip retaining portion.

8. A lip keeper support system according to claim 6, wherein each of the at least two lip supporting positions has a profile chosen from a U-shaped profile, a V-shaped profile, an L-shaped profile, or a modified L-shaped profile having an upright section located at an angle greater than ninety degrees with respect to a substantially horizontal portion of the modified L-shaped profile.

9. A lip keeper support system according to claim 1, wherein the at least two supporting positions is a first supporting position and a second supporting position, and the second supporting position is displaced from the first supporting position vertically and horizontally.

10. A dock leveler, comprising:
a ramp;
a lip pivotally attached to the ramp; and
a lip holder comprising at least two lip supporting positions, wherein each of the at least two lip supporting positions is configured to engage the lip and stop downward travel of the lip.

11. A dock leveler according to claim 10, wherein the lip is configured to pivot from a raised position to a pendant position through various lowered positions, and the at least two lip supporting positions includes a first lip supporting position configured to engage the lip in the pendant position, and a second lip supporting position configured to engage the lip in a lowered position.

12. A dock leveler according to claim 10, wherein the at least two lip supporting positions includes a first lip supporting position and a second lip supporting position, the first lip supporting position is configured to cooperate with the lip to support the ramp in a substantially dock level position, and the second lip supporting position is configured to cooperate with the lip to support the ramp at a first below dock level position.

13. A dock leveler according to claim 10, wherein the dock leveler is an upwardly-biased, mechanically-operated dock leveler.

14. A dock leveler according to claim 10, further comprising at least one support leg apparatus for supporting the ramp at a below dock level position.

15. A dock leveler according to claim 14, wherein the support leg apparatus comprises a support leg biased toward a forward position, configured to retract when the ramp falls slower than a predetermined rate, and configured to maintain the forward position when the ramp falls at or greater than a predetermined rate.

16. A dock leveler according to claim 14, wherein the support leg apparatus is configured to support the ramp at a first and a second below dock level position, and the support leg apparatus comprises a support leg configured to pivot from a forward position to a retracted position through intermediate positions, wherein the support leg retracts toward the retracted position when the ramp falls slower than a predetermined rate, maintains the forward position when the ramp falls at or greater than a predetermined rate toward the first below dock level position, maintains an intermediate support position if the support leg has begun to retract toward the retracted position and then falls at or greater than a predetermined rate toward the second below dock level position.

17. A dock leveler according to claim 12, wherein the dock leveler further comprises a support leg apparatus for supporting the ramp at a second below dock level position which is lower than the first below dock level position.

18. A dock leveler according to claim 17, wherein the support leg apparatus comprises at least one automatically-retracting, forwardly-biased support leg.

19. The dock leveler of claim 18, wherein at least one support leg has at least two support positions.

20. A lip keeper support system for use with a dock leveler having a pivotable lip, comprising:
a multi-tiered lip holder means for engaging the lip and stopping the lip from downward travel and supporting the dock leveler at more than one position.

21. A lip keeper support system according to claim 20, wherein the multi-tiered lip holder means comprises at least one body defining or carrying at least one lip supporting position.

22. A lip keeper support system according to claim 21, wherein the at least one body is at least a first body defining or carrying a first lip supporting position and at least a second body defining or carrying a second lip supporting position.

23. A lip keeper support system according to claim 22, wherein the at least one body defines or carries at least two lip supporting positions.

24. A method of supporting a dock leveler having a lip pivotally mounted to a ramp, comprising:
securing a first lip engagement apparatus below the ramp in a location wherein the first lip engagement apparatus is configured to engage and stop downward travel of the lip when fully engaged by the lip when the lip is in a pendant position and the ramp is in a substantially dock level position, and
securing a second lip engagement apparatus below the ramp at a location wherein the second lip engagement apparatus engages and supports the lip to stop downward travel of the lip if the lip should miss the first lip engagement apparatus and continue to a below dock level position.

25. The method of claim 24, wherein the below dock level position is about 2.5 inches below dock level.

26. The method of claim 24, wherein the first lip engagement apparatus and the second lip engagement apparatus are a single unit such that the step of securing the first lip engagement apparatus and the step of securing the second lip engagement are simultaneous.

* * * * *